United States Patent
Shimizu et al.

(10) Patent No.: US 8,204,118 B2
(45) Date of Patent: Jun. 19, 2012

(54) VIDEO ENCODING METHOD AND DECODING METHOD, APPARATUSES THEREFOR, PROGRAMS THEREFOR, AND STORAGE MEDIA WHICH STORE THE PROGRAMS

(75) Inventors: Shinya Shimizu, Yokosuka (JP); Hideaki Kimata, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 251 days.

(21) Appl. No.: 12/665,890

(22) PCT Filed: Jun. 23, 2008

(86) PCT No.: PCT/JP2008/061398
§ 371 (c)(1),
(2), (4) Date: Dec. 21, 2009

(87) PCT Pub. No.: WO2009/001791
PCT Pub. Date: Dec. 31, 2008

(65) Prior Publication Data
US 2010/0189177 A1 Jul. 29, 2010

(30) Foreign Application Priority Data
Jun. 25, 2007 (JP) ................. 2007-165828

(51) Int. Cl.
*H04N 7/12* (2006.01)
(52) U.S. Cl. ......... 375/240.12; 375/240.01; 375/240.02; 348/218.1; 396/30
(58) Field of Classification Search ............. 375/240.01, 375/240.02, 240.12; 348/218.1; 396/310
See application file for complete search history.

(56) References Cited

U.S. PATENT DOCUMENTS
6,055,274 A * 4/2000 McVeigh ................. 375/240.16
(Continued)

FOREIGN PATENT DOCUMENTS
EP 1414245 A1 4/2004
(Continued)

OTHER PUBLICATIONS

Merkle, Philipp, et al., "Efficient Prediction Structures for Multi-view Video Coding," IEEE, received for depositing on Dec. 15, 2006, found on the Internet at URL http://ip.hhi.de/imagecom_G1/assets/pdfs/ieee07_Prediction_MVC.pdf.

(Continued)

*Primary Examiner* — Joseph Ustaris
*Assistant Examiner* — Hang Gao
(74) *Attorney, Agent, or Firm* — Harness, Dickey & Pierce, P.L.C.

(57) ABSTRACT

A video encoding apparatus used in encoding of a multi-viewpoint image. The apparatus generates a synthetic image for a camera used for obtaining an encoding target image, by using an already-encoded reference camera image having a viewpoint different from the viewpoint of the camera used for obtaining the encoding target image, and disparity information between the reference camera image and the encoding target image, thereby encoding the encoding target image. A predicted image for a differential image between an input image of an encoding target area to be encoded and the synthetic image generated therefor is generated, and a predicted image for the encoding target area, which is represented by the sum of the predicted differential image and the synthetic image for the encoding target area, is generated. A prediction residual represented by a difference between the predicted image for the encoding target area and the encoding target image of the encoding target area is encoded.

28 Claims, 12 Drawing Sheets

U.S. PATENT DOCUMENTS

| | | | |
|---|---|---|---|
| 7,903,737 B2 * | 3/2011 | Martinian et al. | 375/240.12 |
| 2004/0141615 A1 | 7/2004 | Chujoh et al. | |
| 2005/0031035 A1 | 2/2005 | Vedula et al. | |
| 2006/0002073 A1 | 1/2006 | Fan | |
| 2006/0023073 A1 | 2/2006 | Li et al. | |
| 2006/0023782 A1 | 2/2006 | Cai et al. | |
| 2009/0010323 A1 * | 1/2009 | Su et al. | 375/240.01 |
| 2009/0279608 A1 * | 11/2009 | Jeon et al. | 375/240.16 |

FOREIGN PATENT DOCUMENTS

| | | |
|---|---|---|
| EP | 1622083 A2 | 2/2006 |
| JP | 7-212763 A | 8/1995 |
| JP | 10-191393 A | 7/1998 |
| JP | 10-191394 A | 7/1998 |
| JP | 11-341521 A | 12/1999 |
| JP | 2001-186543 A | 7/2001 |
| JP | 2001-285895 A | 10/2001 |
| JP | 2004-007377 A | 1/2004 |
| JP | 2006-081161 A | 3/2006 |
| JP | 2007-036800 A | 2/2007 |
| RU | 2 168 192 C2 | 5/2001 |
| RU | 2 237 283 C2 | 9/2004 |
| WO | WO-03/088679 A1 | 10/2003 |
| WO | 2006/073116 A1 | 7/2006 |

OTHER PUBLICATIONS

Kimata, Hideaki, et al., "Inter-view prediction with down-sampled reference pictures," Joint Video Team (JVT) of ISO/IEC MPEG & ITU-T VCEG, Doc. JVT-W079, 23rd Meeting: San Jose, USA, Apr. 21-27, 2007.

ITU-T Rec.H.264/ISO/IEC 11496-10, "Editor's Proposed Draft Text Modifications for Joint Video Specification (ITU-T Rec. H.264/ISO/IEC 14496-10 AVC), Draft 7", Document JVT-E022d7, pp. 10-13, and 62-73, Sep. 2002. (in English).

M. Kitahara, H. Kimata, M. Tanimoto, T. Fujii and K. Yamamoto, Report of Core Experiment on View Interpolation (Multi-view Video Coding CE3), Document JVT-T119, pp. 1-8, Jul. 2006. (in English).

ITU-T Rec.H.264/ISO/IEC 11496-10, "Editors Proposed Draft Text Modifications for Joint Video Specification (ITU-T Rec. H.264/ISO/IEC 14496-10 AVC), Draft 7", Document JVT-E022d7, pp. 10-13, and 62-73, Sep. 2002. (in English).

* cited by examiner

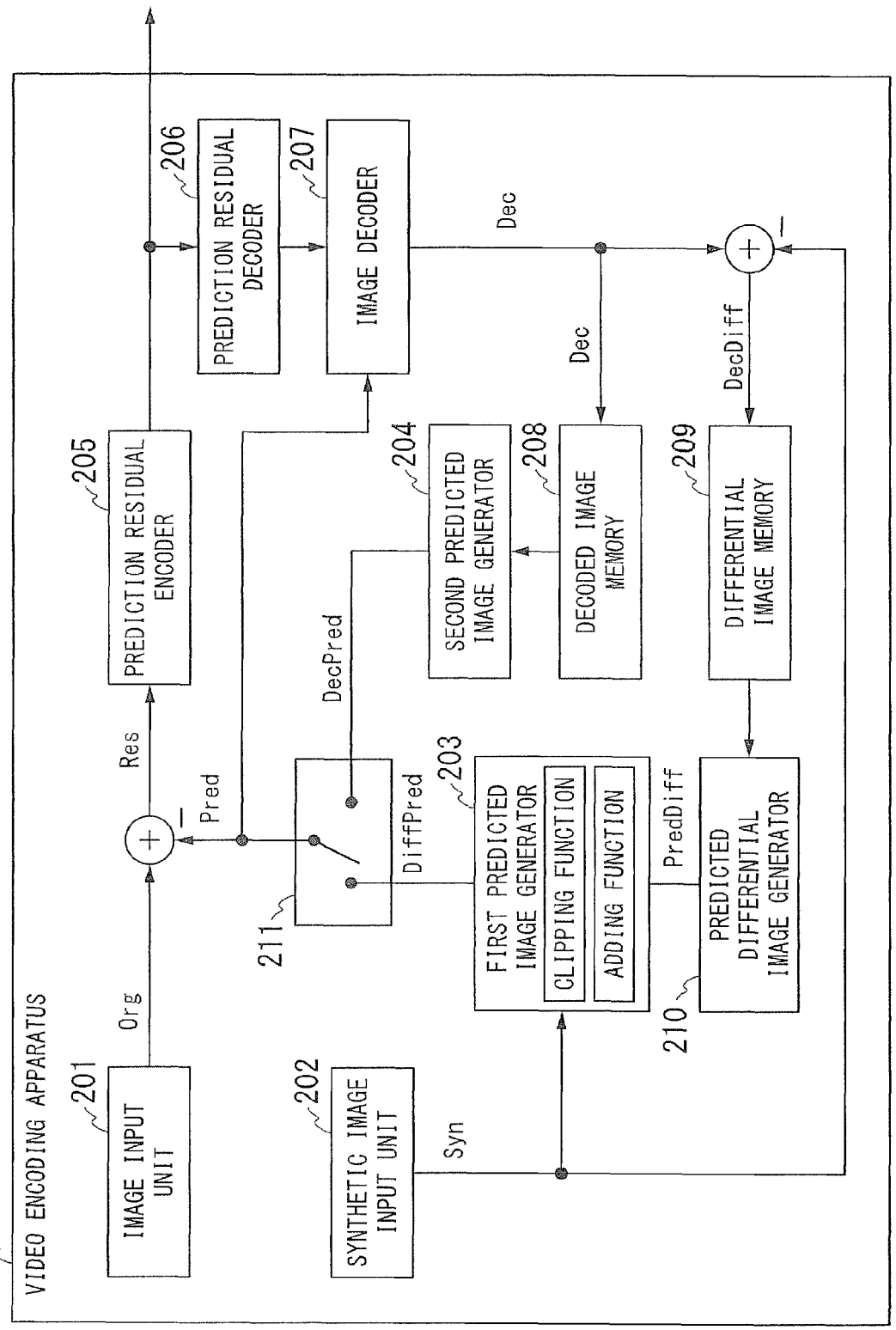

VIDEO ENCODING METHOD AND DECODING METHOD, APPARATUSES THEREFOR, PROGRAMS THEREFOR, AND STORAGE MEDIA WHICH STORE THE PROGRAMS

TECHNICAL FIELD

The present invention relates to a video encoding apparatus used for encoding multi-viewpoint video images and a corresponding method, a video decoding apparatus used for decoding data encoded by the relevant video encoding technique and a corresponding method, a video encoding program for implementing the video encoding apparatus and a computer-readable storage medium which stores the program, and a video decoding program for implementing the video decoding apparatus and a computer-readable storage medium which stores the program.

Priority is claimed on Japanese Patent Application No. 2007-165828, filed Jun. 25, 2007, the contents of which are incorporated herein by reference.

BACKGROUND ART

Multi-viewpoint images are a plurality of images obtained by photographing the same object and background thereof using a plurality of cameras, and multi-viewpoint images are video images for the multi-viewpoint images. Below, a video image obtained by a single camera is called a "two-dimensional video image", and a set of multiple two-dimensional video images obtained by photographing the same object and background thereof is called a "multi-viewpoint video image".

There is a strong temporal correlation in a two-dimensional video image, and encoding efficiency thereof is improved by using the temporal correlation. In addition, for a multi-viewpoint video image, when the cameras are synchronized with each other, the images (taken by the cameras) at the same time capture the object and background thereof in entirely the same state from different positions, so that there is a strong correlation between the cameras. The encoding efficiency for encoding the multi-viewpoint video image can be improved using this correlation.

First, conventional techniques relating to the encoding of two-dimensional video images will be shown.

In many known methods of encoding two-dimensional video images, such as H. 264, MPEG-2, MPEG-4 (which are international encoding standards), and the like, highly efficient encoding is performed by means of motion compensation, orthogonal transformation, quantization, entropy encoding, or the like. In a technique called "motion compensation", temporal correlation between frames are used.

Non-Patent Document 1 discloses detailed techniques of motion compensation used in H. 264. General explanations thereof follow.

In accordance with the motion compensation in H. 264, an encoding target frame is divided into blocks of any size, and each block can have an individual motion vector, thereby achieving a high level of encoding efficiency even for a local change in a video image. In addition, as candidates for a reference frame, past or future frames (with respect to the present frame), which have already been encoded, may be prepared for an encoding target frame so that each block can use an individual reference frame, thereby implementing a high level of encoding efficiency even for a video image in which an occlusion occurs due to a temporal change.

Next, conventional encoding methods of multi-viewpoint images or multi-viewpoint video images will be explained.

As the encoding of multi-viewpoint video images uses a correlation between cameras, the multi-viewpoint video images are highly efficiently encoded in a known method which uses "disparity compensation" in which motion compensation is applied to images obtained by different cameras, which have different viewpoints, at the same time. Here, disparity is the difference between positions, to which the same point on an imaged object is projected, on the image planes of cameras which are disposed at different positions.

FIG. 12 is a schematic view showing the concept of disparity generated between such cameras. That is, FIG. 12 shows a state in which an observer looks down on image planes of cameras, whose optical axes are parallel to each other, from the upper side of the image planes. Generally, such points, to which the same point on an imaged object is projected, on image planes of different cameras, are called "corresponding points". In disparity compensation, based on the above corresponding relationship, each pixel value of an encoding target frame is predicted using a reference frame, and the relevant prediction residual and disparity information which indicates the corresponding relationship are encoded.

For each frame in a multi-viewpoint video image, temporal redundancy and redundancy between cameras are present at the same time. Patent Document 1 discloses a method for removing both redundancies simultaneously.

In the relevant method, a differential image between an input image and the corresponding disparity-compensated image is generated at each specific time, and the generated images are regarded as a two-dimensional video image so as to perform encoding together with motion compensation. In accordance with such a method, temporal redundancy, which cannot be removed by a disparity compensation for removing the inter-camera redundancy, can be removed using the motion compensation. Therefore, a prediction residual, which is encoded in a final process, is reduced, so that a high level of encoding efficiency can be achieved.

Non-Patent Document 1: ITU-T Rec.H.264/ISO/IEC 11496-10, "Editor's Proposed Draft Text Modifications for Joint Video Specification (ITU-T Rec. H.264/ISO/IEC 14496-10 AVC), Draft 7", Document JVT-E022d7, pp. 10-13, and 62-73, September 2002.

Patent Document 1: Japanese Unexamined Patent Application, First Publication No. 2007-036800.

DISCLOSURE OF INVENTION

Problem to be Solved by the Invention

In accordance with the conventional multi-viewpoint video encoding method performing motion compensation while regarding a disparity-compensation residual image (i.e., a differential image between an input image and the corresponding disparity-compensated image) as a video image, the prediction residual in a part having both the temporal and inter-camera redundancies can be reduced, so that multi-viewpoint video encoding can be efficiently performed.

However, the bit depth (i.e., quantization bit rate) for the a differential video (image) signal is larger than an ordinal video signal by 1 bit. Therefore, the encoder and decoder for implementing the above method have larger sizes than those for coding an original video image. That is, in an example case of an 8-bit image having the minimum value of 0 and the maximum value of 255, the relevant differential image has the minimum value of −255 and the maximum value of +255.

Therefore, the bit depth of the differential video signal is larger than an ordinal video signal by 1 bit.

In addition, there is also a camera for which an ordinary image itself is encoded and decoded, such as a camera corresponding to a base viewpoint (i.e., a selected camera as one having the base viewpoint). Therefore, the total multi-viewpoint video encoder and decoder system must have a mechanism for handling two different bit depths, which increases a circuit or equipment size.

Additionally, in an area where an image of an encoding and decoding target camera cannot be predicted using an image of another camera, due to an occlusion or the like, encoding and decoding using a differential image may degrade the encoding efficiency in comparison with encoding and decoding using no differential image. Therefore, the encoding efficiency can be improved by adaptively switching between the encoding and decoding using a differential image and the encoding and decoding using no differential image.

However, as the bit depth is different between using and non-using a differential image, a single encoder and decoder system cannot handle both cases. Therefore, when performing such an adaptive switching operation, the encoder and decoder system should process two signal types only for encoding and decoding a video image at a single viewpoint, which increases a circuit or equipment size.

In addition to such a circuit or equipment size problem, when applying motion compensation to a differential video image, a useless signal may be encoded in an area where the pixel value of the original video image is the maximum or minimum value within a permissive range.

In an example of an 8-bit video image, it is assumed that a pixel of an original image has a pixel value of 255, and that the pixel value at the corresponding position of the relevant synthetic image (i.e., disparity-compensated image) is 250. In this case, the corresponding pixel in the differential image has a pixel value of 5. If the pixel value of the relevant pixel is predicted using a differential image at a different time and the predicted value is 10, then "−5" as a difference between 5 and 10 is encoded.

However, the maximum pixel value of the original video image is 255, and any value larger than 255 is converted into 255 by clipping. Therefore, a value "260", which is obtained by adding the predicted value "10" (due to the motion compensation of the differential image) to the pixel value "250" of the synthetic image (i.e., when encoding "0" instead of "−5"), can also indicate the value "255" of the input video image. That is, in this case, encoding of "−5" as a prediction residual between the differential images is useless, and it causes an increase in the amount of generated code.

As described above, when applying motion compensation to a differential image, a useless signal may be encoded in an area where the pixel value of the original video image is the maximum or minimum value within a permissive range.

In light of the above circumstances, an object of the present invention is to provide novel video encoding and decoding techniques using prediction of a differential video image between an input video image and a synthetic video image, by which when encoding a multi-viewpoint video image, it is unnecessary for the encoder and decoder to handle different bit depths, by making a predicted image for an input image by adding a pixel value of a synthetic image to the corresponding predicted value obtained using a differential image.

Means for Solving the Problem

In order to solve the above problems, the present invention provides a video encoding apparatus used in encoding of a multi-viewpoint image obtained by cameras having different viewpoints, wherein the apparatus generates a synthetic image for a camera used for obtaining an encoding target image, by using at least one already-encoded reference camera image having a viewpoint different from the viewpoint of the camera used for obtaining the encoding target image, and disparity information between the reference camera image and the encoding target image, encodes the encoding target image by using the synthetic image, and comprises:

a differential image prediction device that generates a predicted image for a differential image between an input image of an encoding target area to be encoded and the synthetic image generated therefor;

a predicted image generation device that generates a predicted image for the encoding target area, where the predicted image is represented by the sum of the predicted differential image generated by the differential image prediction device and the synthetic image for the encoding target area; and a prediction residual encoding device that encodes a prediction residual represented by a difference between the predicted image for the encoding target area generated by the predicted image generation device and the encoding target image of the encoding target area.

In a typical example, the differential image prediction device generates the predicted image for the differential image with respect to the encoding target area, by using a differential image at a time which is the same as the time when the encoding target image was obtained, where the used differential image is represented by a difference between a decoded image of an already-encoded area in the encoding target image and the synthetic image for the already-encoded area.

In another typical example, the differential image prediction device generates the predicted image for the differential image with respect to the encoding target area, by using a differential image at a time different from the time when the encoding target image was obtained, where the used differential image is represented by a difference between a decoded image of an already-encoded image which was obtained at the viewpoint used for obtaining the encoding target image and the synthetic image at the same time as the time of the decoded image.

In another typical example, the video encoding apparatus further comprises:

an image decoding device that generates a decoded image of the encoding target image by decoding encoded data of the encoding target image; and a decoded differential image generation and storage device that generates a decoded differential image represented by a difference between the decoded image generated by the image decoding device and the synthetic image, and stores the generated decoded differential image into a storage memory, wherein the differential image prediction device generates the predicted image for the differential image with respect to the encoding target area, by using the decoded differential image stored in the storage memory.

In another typical example, the video encoding apparatus further comprises:

a prediction residual decoding device that decodes the prediction residual encoded by the prediction residual encoding device; and a decoded differential image generation and storage device that generates a decoded differential image represented by the sum of the decoded prediction residual generated by the prediction residual decoding device and the predicted differential image, and stores the generated decoded differential image into a storage memory, wherein the differential image prediction device generates the predicted image for the differential image with respect to the encoding target area, by using the decoded differential image stored in the storage memory.

In a preferable example for this case, the decoded differential image generation and storage device performs clipping so that each pixel of the decoded differential image has a pixel value within a predetermined effective range.

In another typical example, the video encoding apparatus further comprises:

an original image prediction device that generates a predicted image for the encoding target image, by using any one of a decoded image of an already-encoded area in the encoding target image and a decoded image of an already-encoded image which was obtained at the same viewpoint as that used for obtaining the encoding target image and at a time different from the time of the encoding target image, wherein the predicted image generation device selectively performs one of generation of the predicted image for the encoding target image based on the predicted differential image and the synthetic image and generation of the predicted image for the encoding target image by directly using the predicted image generated by the original image prediction device.

In a preferable example, the predicted image generation device performs clipping so that each pixel of the predicted image has a pixel value within a predetermined effective range.

The present invention also provides a video decoding apparatus used in decoding of encoded data of a multi-viewpoint image obtained by cameras having different viewpoints, wherein the apparatus generates a synthetic image for a camera used for obtaining a decoding target image, by using at least one already-decoded reference camera image having a viewpoint different from the viewpoint of the camera used for obtaining an encoding target image, and disparity information between the reference camera image and the decoding target image, decodes encoded data of the decoding target image by using the synthetic image, and comprises:

a prediction residual decoding device that decodes a prediction residual of the decoding target image, where the prediction residual is included in the encoded data;

a differential image prediction device that generates a predicted image for a differential image between a decoding target image of a decoding target area to be decoded and the synthetic image generated therefor; and an image decoding device that decodes the decoding target image by adding the predicted differential image generated by the differential image prediction device, the prediction residual decoded by the prediction residual decoding device, and the synthetic image.

In a typical example, the differential image prediction device generates the predicted image for the differential image with respect to the decoding target area, by using a differential image at a time which is the same as the time when the decoding target image was obtained, where the used differential image is represented by a difference between a decoded image of an already-decoded area in the decoding target image and the synthetic image for the already-decoded area.

In another typical example, the differential image prediction device generates the predicted image for the differential image with respect to the decoding target area, by using a differential image at a time different from the time when the decoding target image was obtained, where the used differential image is represented by a difference between an already-decoded reference image which was obtained at the viewpoint used for obtaining the decoding target image and the synthetic image at the same time as the time of the reference image.

In another typical example, the video decoding apparatus further comprises:

a decoded differential image generation and storage device that generates a decoded differential image represented by a difference between the decoded image generated by the image decoding device and the synthetic image, and stores the generated decoded differential image into a storage memory, wherein the differential image prediction device generates the predicted image for the differential image with respect to the decoding target area, by using the decoded differential image stored in the storage memory.

In another typical example, the video decoding apparatus further comprises:

a decoded differential image generation and storage device that generates a decoded differential image represented by the sum of the decoded prediction residual generated by the prediction residual decoding device and the predicted differential image, and stores the generated decoded differential image into a storage memory, wherein the differential image prediction device generates the predicted image for the differential image with respect to the decoding target area, by using the decoded differential image stored in the storage memory.

In a preferable example for this case, the decoded differential image generation and storage device performs clipping so that each pixel of the decoded differential image has a pixel value within a predetermined effective range.

In another typical example, the video decoding apparatus further comprises:

an original image prediction device that generates a predicted image for the decoding target image, by using any one of an already-decoded image of the decoding target image and an already-decoded image which was obtained at the same viewpoint as that used for obtaining the decoding target image and at a time different from the time of the decoding target image, wherein for the decoding target area, the image decoding device selectively performs one of decoding of the decoding target image by adding the predicted differential image generated by the differential image prediction device, the prediction residual decoded by the prediction residual decoding device, and the synthetic image, and decoding of the decoding target image by adding the predicted image generated by the original image prediction device to the prediction residual decoded by the prediction residual decoding device.

The present invention also provides a video encoding method used in encoding of a multi-viewpoint image obtained by cameras having different viewpoints, wherein the method generates a synthetic image for a camera used for obtaining an encoding target image, by using at least one already-encoded reference camera image having a viewpoint different from the viewpoint of the camera used for obtaining the encoding target image, and disparity information between the reference camera image and the encoding target image, encodes the encoding target image by using the synthetic image, and comprises:

a differential image prediction step that generates a predicted image for a differential image between an input image of an encoding target area to be encoded and the synthetic image generated therefor;

a predicted image generation step that generates a predicted image for the encoding target area, where the predicted image is represented by the sum of the predicted differential image generated by the differential image prediction step and the synthetic image for the encoding target area; and a prediction residual encoding step that encodes a prediction residual represented by a difference between the predicted image for the encoding target area generated by the predicted image generation step and the encoding target image of the encoding target area.

In a typical example, the differential image prediction step generates the predicted image for the differential image with respect to the encoding target area, by using a differential image at a time which is the same as the time when the encoding target image was obtained, where the used differential image is represented by a difference between a decoded image of an already-encoded area in the encoding target image and the synthetic image for the already-encoded area.

In another typical example, the differential image prediction step generates the predicted image for the differential image with respect to the encoding target area, by using a differential image at a time different from the time when the encoding target image was obtained, where the used differential image is represented by a difference between a decoded image of an already-encoded image which was obtained at the viewpoint used for obtaining the encoding target image and the synthetic image at the same time as the time of the decoded image.

In another typical example, the video encoding method further comprises:

a prediction residual decoding step that decodes the prediction residual encoded by the prediction residual encoding step; and a decoded differential image generation and storage step that generates a decoded differential image represented by the sum of the decoded prediction residual generated by the prediction residual decoding step and the predicted differential image, and stores the generated decoded differential image into a storage memory, wherein the differential image prediction step generates the predicted image for the differential image with respect to the encoding target area, by using the decoded differential image stored in the storage memory.

In another typical example, the video encoding method further comprises:

an original image prediction step that generates a predicted image for the encoding target image, by using any one of a decoded image of an already-encoded area in the encoding target image and a decoded image of an already-encoded image which was obtained at the same viewpoint as that used for obtaining the encoding target image and at a time different from the time of the encoding target image, wherein the predicted image generation step selectively performs one of generation of the predicted image for the encoding target image based on the predicted differential image and the synthetic image and generation of the predicted image for the encoding target image by directly using the predicted image generated by the original image prediction step.

The present invention also provides a video decoding method used in decoding of encoded data of a multi-viewpoint image obtained by cameras having different viewpoints, wherein the method generates a synthetic image for a camera used for obtaining a decoding target image, by using at least one already-decoded reference camera image having a viewpoint different from the viewpoint of the camera used for obtaining an encoding target image, and disparity information between the reference camera image and the decoding target image, decodes encoded data of the decoding target image by using the synthetic image, and comprises:

a prediction residual decoding step that decodes a prediction residual of the decoding target image, where the prediction residual is included in the encoded data;

a differential image prediction step that generates a predicted image for a differential image between a decoding target image of a decoding target area to be decoded and the synthetic image generated therefor; and an image decoding step that decodes the decoding target image by adding the predicted differential image generated by the differential image prediction step, the prediction residual decoded by the prediction residual decoding step, and the synthetic image.

In a typical example, the differential image prediction step generates the predicted image for the differential image with respect to the decoding target area, by using a differential image at a time which is the same as the time when the decoding target image was obtained, where the used differential image is represented by a difference between a decoded image of an already-decoded area in the decoding target image and the synthetic image for the already-decoded area.

In another typical example, the differential image prediction step generates the predicted image for the differential image with respect to the decoding target area, by using a differential image at a time different from the time when the decoding target image was obtained, where the used differential image is represented by a difference between an already-decoded reference image which was obtained at the viewpoint used for obtaining the decoding target image and the synthetic image at the same time as the time of the reference image.

In another typical example, the video decoding method further comprises:

a decoded differential image generation and storage step that generates a decoded differential image represented by the sum of the decoded prediction residual generated by the prediction residual decoding step and the predicted differential image, and stores the generated decoded differential image into a storage memory, wherein the differential image prediction step generates the predicted image for the differential image with respect to the decoding target area, by using the decoded differential image stored in the storage memory.

In this case, preferably, the decoded differential image generation and storage step performs clipping so that each pixel of the decoded differential image has a pixel value within a predetermined effective range.

In another typical example, the video decoding method further comprises:

an original image prediction step that generates a predicted image for the decoding target image, by using any one of an already-decoded image of the decoding target image and an already-decoded image which was obtained at the same viewpoint as that used for obtaining the decoding target image and at a time different from the time of the decoding target image, wherein for the decoding target area, the image decoding step selectively performs one of decoding of the decoding target image by adding the predicted differential image generated by the differential image prediction step, the prediction residual decoded by the prediction residual decoding step, and the synthetic image, and decoding of the decoding target image by adding the predicted image generated by the original image prediction step to the prediction residual decoded by the prediction residual decoding step.

The devices for forming the above-described video encoding apparatus or video decoding apparatus of the present invention can also be implemented by a computer program. Such a computer program may be provided by storing it in an appropriate computer-readable storage medium, or by means of a network, and can be installed and operate on a control device such as a CPU so as to implement the present invention.

As described above, in the present invention, a differential video image between an input video mage and a synthetic video image in an already-encoded area is used for predicting a difference between an input image and a synthetic video image in an encoding target area. The synthetic video image in the encoding target area is added to the predicted difference, thereby generating a predicted video image for the relevant input image.

Therefore, when encoding a prediction residual, similar to ordinary video encoding methods, the prediction residual between the input video image and a predicted video image is encoded. That is, no increase in the bit depth of a signal processed in a residual encoding step occurs while such an increase occurs in conventional methods. In addition, as the prediction itself is applied to the difference between the input video image and the synthetic video image therefor, an inter-camera correlation and a spatial correlation in a frame can be simultaneously used, thereby implementing a high degree of encoding efficiency.

In the relevant method, the synthetic video image may be generated (i) using a reference image and depth information of a target scene (as performed in Patent Document 1), (ii) using a plurality of reference images while searching for corresponding points (as performed in the following Reference Document), or (iii) using any other method. That is, it is possible to use any method which can synthesize an image obtained at a viewpoint of an encoding target camera.

Reference Document: M. Kitahara, H. Kimata, M. Tanimoto, T. Fujii and K. Yamamoto, "Report of Core Experiment on View Interpolation (Multi-view Video Coding CE3)," Document JVT-T119, pp. 1-8, July, 2006.

In addition, similar to many known methods of encoding two-dimensional video images, such as H. 264, MPEG-2, MPEG-4 (which are international encoding standards), and the like, the residual encoding can be performed by any method such as DCT, quantization, or vector encoding using a template.

In the present invention, when a predicted result using a differential video image is added to a synthetic video image so as to predict an input video image, instead of spatially predicting a differential video image between the input video image and the synthetic video image within a frame, the differential video image may be predicted using a temporal correlation of the differential video image between the present frame and another frame at another time.

Also in this method, when encoding a prediction residual, similar to ordinary video encoding, the prediction residual between the input video image and a predicted video image is encoded. That is, it is possible to solve a problem of conventional methods in which the bit depth of a signal processed in a residual encoding step is increased. In addition, an inter-camera correlation and a temporal correlation can be simultaneously used, thereby implementing a high degree of encoding efficiency.

Furthermore, encoding may be performed while selecting a spatial correlation in a frame or a temporal correlation for the residual image, which can implement a higher degree of encoding efficiency.

In ordinary video encoding methods, a decoded video image of an already-encoded input video image is stored and used for generating a predicted video image. However, in the present invention, a differential video image between an input video image and a synthetic video image is used for generating a predicted video image for the input video image. That is, it is necessary to generate a synthetic video image and compute a difference from the stored decoded video image every time a predicted video image is generated, which requires a considerable computation cost.

Therefore, after obtaining a decoded video image, an already-generated synthetic video image is subtracted from the obtained image so as to generate a differential video image, and the differential video image is stored for generating a predicted video image. Accordingly, it is possible to omit a process of generating a differential video image every time, and to considerably reduce the computation cost.

When performing prediction using a differential video image, decoded data of the encoded prediction residual and a predicted value of the differential video image may be added so as to generate a differential video image for a decoded video image. Accordingly, in comparison with the generation of a differential video image after generating a decoded video image, the computation for subtracting a synthetic video image can be omitted, thereby further reducing the computation cost.

In such a case, the sum of the decoded residual data and the predicted differential video image may be clipped using the minimum value obtained by applying a minus sign to the corresponding pixel value of the synthetic video image, and the maximum value represented by the sum of the minimum value and the largest value among permissible pixel values for the decoded video image. Accordingly, it is possible to generate a differential video image which is completely equal to that obtained after generating a decoded video image.

In addition, encoding of the input video image may be performed while selecting predicted video image generation using a differential video image or predicted video image generation using no differential video image.

When there is an occlusion, the synthetic video image cannot be accurately generated. In such a case, a considerable error is included in a differential video image generated by the input video image and the synthetic video image, and efficient encoding cannot be performed. Therefore, in such a case, the input video image can be efficiently encoded by only using a temporal correlation.

When generating a differential video image and performing encoding using the differential video image as input data, as performed in conventional methods, not only an input signal but also an encoder itself should be changed for performing the encoding using no differential image because the bit depth of an encoding target video signal is changed. This indicates that an encoder for processing a single video image should include encoders for handling two different signals.

In contrast, in the present invention, in either case when performing the prediction based on a differential video image or on an input video image, the input signal handled by the encoder is an input video image, and the predicted signal is a predicted video image for the input video image. Therefore, the same input signal and the same encoder can be used for either case. Accordingly, it is possible to considerably reduce the circuit or equipment size of the encoder.

Effect of the Invention

As described above, in accordance with the present invention, when encoding a multi-viewpoint video image, a predicted signal for a differential video image between an input video image and a corresponding synthetic video image is generated, and the sum of the generated predicted differential video image and the synthetic video image is treated as a predicted signal for the input video image. Therefore, it is possible to perform highly efficient encoding using a differential video image with a reduced circuit or equipment size.

In the conventional techniques, a differential video image between an input video image and a corresponding synthetic video image is generated, and the generated predicted differential video image is encoded. In contrast, in the present invention, a predicted signal for the relevant differential video image is generated, and the sum of the generated predicted differential video image and the synthetic video image is treated as a predicted signal for the input video image, so that the input video image is directly encoded. Therefore, it is possible to perform highly efficient encoding using prediction of a differential video image with a reduced circuit or equipment size.

BRIEF DESCRIPTION OF THE DRAWINGS

FIG. 5 is a diagram showing the structure of a video encoding apparatus of Embodiment 2 in accordance with the present invention.

Figure 1:
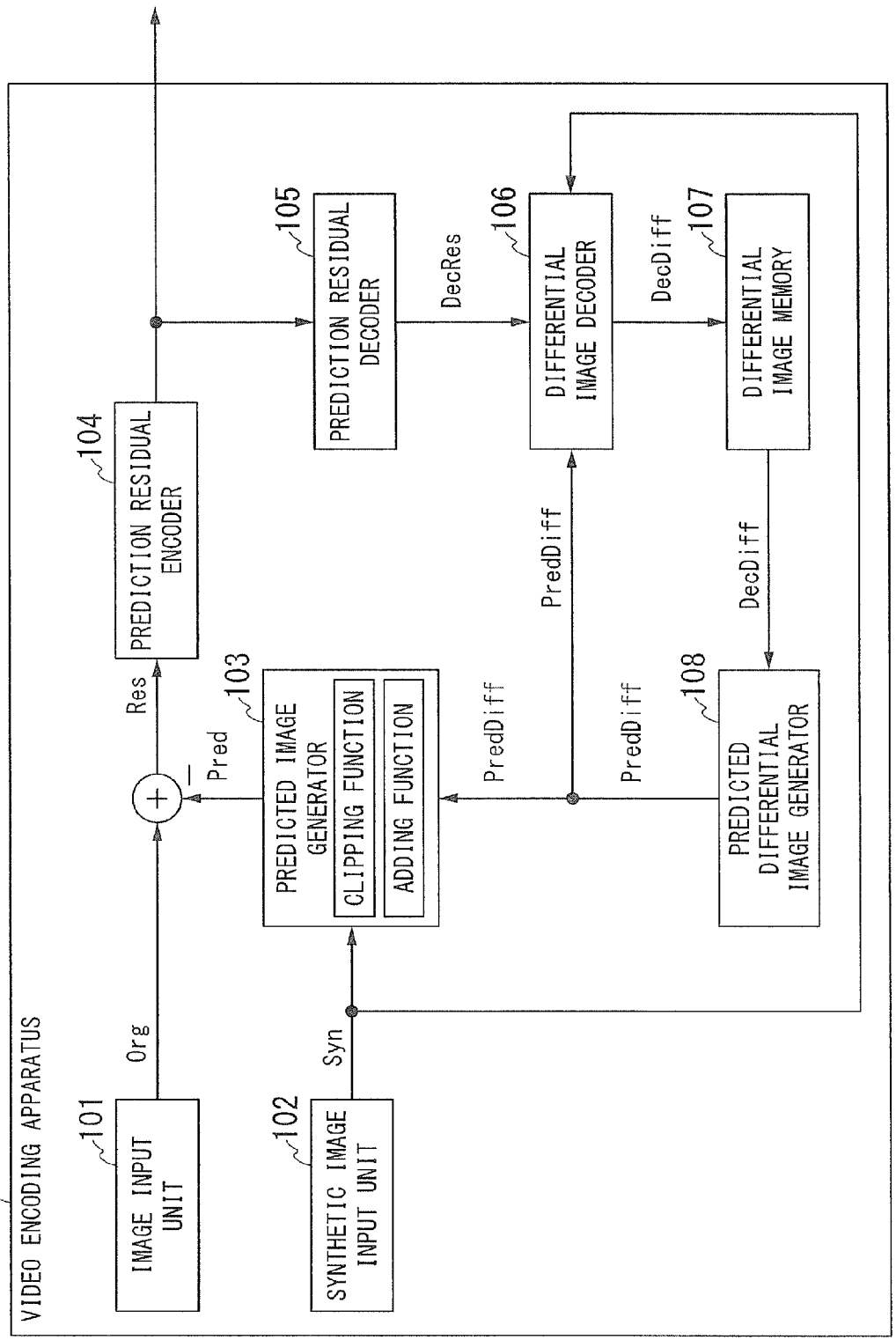
FIG. 1 is a diagram showing the structure of a video encoding apparatus of Embodiment 1 in accordance with the present invention.

REFERENCE SYMBOLS 100 video encoding apparatus
101 image input unit
102 synthetic image input unit
103 predicted image generator
104 prediction residual encoder
105 prediction residual decoder
106 differential image decoder
107 differential image memory
108 predicted differential image generator

BEST MODE FOR CARRYING OUT THE INVENTION

Below, the present invention will be explained in detail in accordance with embodiments.

The following embodiments relate to a method of encoding and decoding a video image obtained at a viewpoint by using (i) one or more video images, which have been already encoded and decoded, and were obtained at viewpoints different from the viewpoint of the encoding target, and (ii) a synthetic video image generated using disparity information between the different viewpoints and the viewpoint of the encoding target.

The disparity information necessary for generating the synthetic video image may be produced on the encoder side and then transmitted to the decoder side, or the same information may be computed between the encoder and decoder sides. Additionally, generation of the synthetic video image using the disparity information may be performed by any method, for example, by computing an average or a representative value based on corresponding point information between a plurality of viewpoints.

Embodiment 1

A first embodiment (called "Embodiment 1" below) will be explained first.

FIG. 1 shows the structure of a video encoding apparatus 100 for Embodiment 1 of the present invention.

As shown in FIG. 1, the video encoding apparatus 100 has an image input unit 101, a synthetic image input unit 102, a predicted image generator 103, a prediction residual encoder 104, a prediction residual decoder 105, a differential image decoder 106, a differential image memory 107, and a predicted differential image generator 108.

The image input unit 101 inputs a (video) image, obtained by a camera as an encoding target, into the apparatus. The synthetic image input unit 102 inputs a synthetic (video) image (i.e., disparity-compensated image) for the camera into the apparatus.

The predicted image generator 103 generates a predicted image for the input image by adding a predicted differential image generated by the predicted differential image generator 108 and the synthetic image input by the synthetic image input unit 102 to each other, where the predicted differential image is a predicted image for the differential image between the input image and the synthetic image, and is obtained by a prediction using a differential image between a decoded image and the synthetic image.

The prediction residual encoder 104 encodes a prediction residual between the input image input by the input unit 101 and the predicted image generated by the predicted image generator 103, and outputs encoded data. The prediction residual decoder 105 decodes the prediction residual encoded by the prediction residual encoder 104.

The differential image decoder 106 determines a processing range in accordance with the synthetic image input by the synthetic image input unit 102, and simultaneously generates a differential image represented by a difference between a decoded image and the synthetic image, by adding the predicted differential image generated by the predicted differential image generator 108 and the prediction residual decoded by the prediction residual decoder 105 to each other. The differential image memory 107 stores the differential image generated by the differential image decoder 106.

The predicted differential image generator 108 generates a predicted image (i.e., predicted differential image) for the differential image represented by a difference between the input image and the synthetic image, by using the differential image stored in the differential image memory 107.

Figure 2:
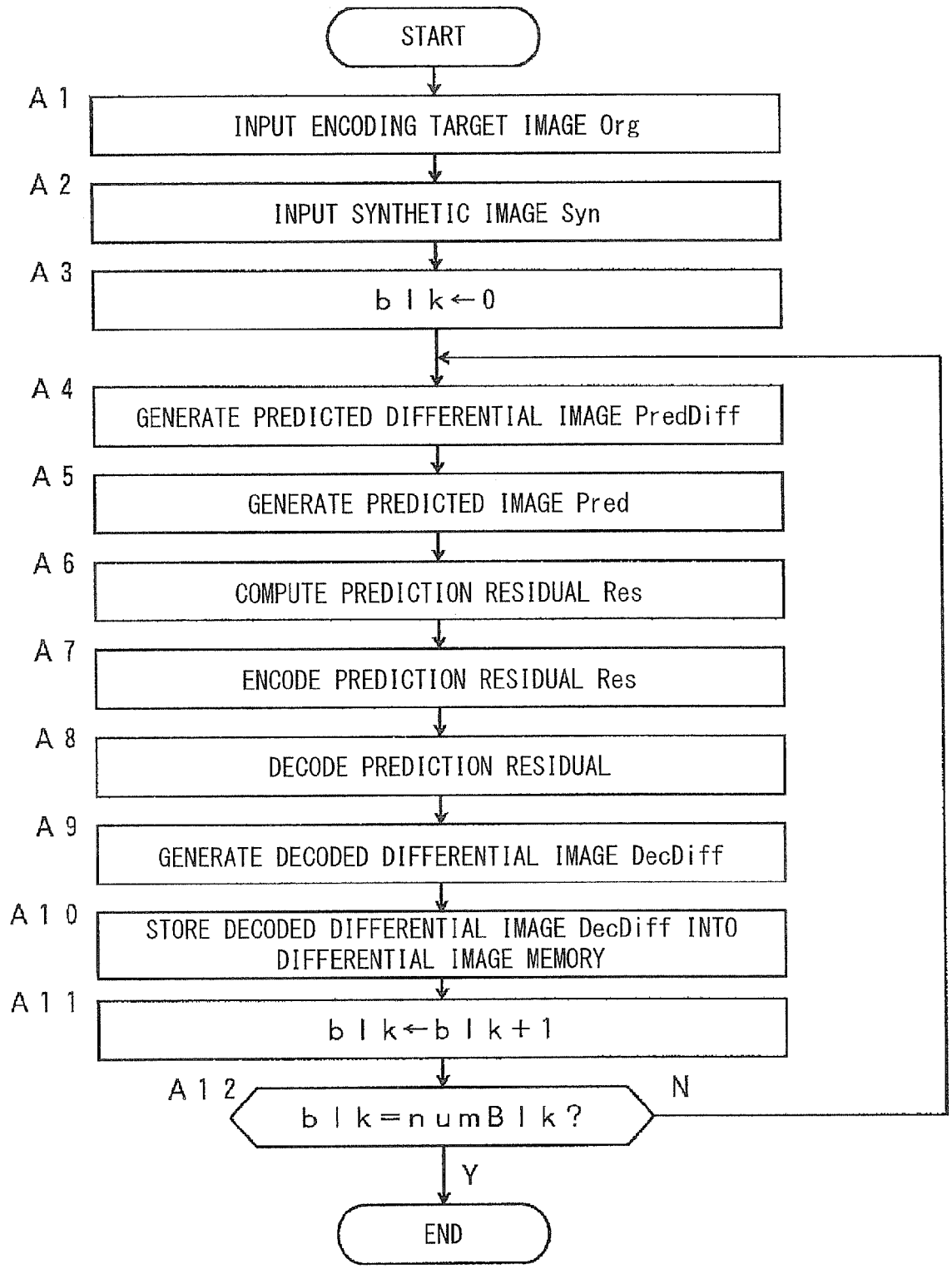
FIG. 2 is an operation flow performed by the video encoding apparatus of Embodiment 1.

FIG. 2 shows an operation flow performed by the video encoding apparatus 100 of Embodiment 1, which has the above-described structure.

The operation flow shows an operation performed when encoding an image (i.e., frame) at a target time, by using the video encoding apparatus 100 of Embodiment 1. When encoding a plurality of frames, the relevant operation flow is repeatedly executed.

Below, in accordance with the operation flow, the operation performed by the video encoding apparatus 100 of Embodiment 1 will be explained in detail.

In the video encoding apparatus 100 of Embodiment 1, first, the image input unit 101 input an encoding target image into the apparatus (see step A1). Below, the encoding target image (i.e., input image) will be represented by "Org[.]". In addition, applying "[ ]" to an image indicates an image signal for a specific area.

Next, the synthetic image input unit 102 inputs a synthetic image, which corresponds to the input image Org[.], into the apparatus (see step A2). The synthetic image is represented by "Syn[.]".

In Embodiment 1, the entire image is divided into a plurality of blocks, and an operation is repeatedly applied to each block so as to encode the entire image. Here, division form is not limited to a block, and any division form can be employed. Furthermore, no division is also possible. In the following explanation, "blk" is an index for each block, and numBlk indicates the number of blocks included in an image.

Therefore, after blk is initialized to zero (see step A3), the following process (steps A4 to A10) is repeatedly performed so as to perform encoding while blk is incremented by 1 (see step A11), until blk reaches numBlk (see step A12).

In the process repeated for each block, first, the predicted differential image generator 108 generates a predicted differential image PredDiff[.] by using data (stored in the differential image memory 107) of an already-encoded frame at a time different from the target time or an already-encoded block in the encoding target frame (see step A4).

Generally, prediction using a frame at a different time is called "interframe prediction", and prediction using an already-encoded area in the same frame at the target time is called "intraframe prediction". For the interframe prediction and the intraframe prediction performed in the present operation, any methods employed in a known video encoding system as shown in the above-described Non-Patent Document 1 can be used.

For example, as shown in the following formula (1), an area in another frame at a different time may be designated and a value of the area may be used as a predicted value. In another example, as shown in the following formula (2), a directional prediction based on already-encoded peripheral pixels in the same frame at the target time may be performed.

$$\forall(x,y) \in blk, \text{PredDiff}[t,x,y] = \text{DecDiff}[t-1, x+mv_x, y+mv_y] \quad \text{Formula (1)}$$

$$\forall(x,y) \in blk, \text{PredDiff}[t,x,y] = \text{DecDiff}[t,x,\text{up\_line}] \quad \text{Formula (2)}$$

In the above formulas, DecDiff[.] represents a decoded differential image stored in the differential image memory 107, t indicates the time of the encoding target frame, $(mv_x, mv_y)$ indicates a two-dimensional vector, and up_line indicates the pixel position (here, a line) immediately above "blk".

Next, the predicted image generator 103 generates a predicted image Pred[.] represented by the sum of the predicted differential image PredDiff[.] and the synthetic image Syn[.] (see step A5).

In the above process, each pixel value is clipped to be within an effective range. The effective range for the pixel value is determined in accordance with the bit depth of the input image. For an eight-bit image, the minimum value is 0, and the maximum value is 255. The clipping process is indicated by the following formula (3).

$$\forall(x,y) \in blk, \text{Pred}[t,x,y] = \text{Clip}(\text{PredDiff}[t,x,y] + \text{Syn}[t,x,y], \min, \max) \quad \text{Formula (3)}$$

In the above formula, "min" and "max" respectively indicate the effective minimum and maximum values for the pixel value. In addition, the function Clip returns (i) the value of the second argument when the value of the first argument is smaller than the value of the second argument; (ii) the value of the third argument when the value of the first argument is larger than the value of the third argument; and (iii) the value of the first argument in the other case.

Then, a prediction residual Res[.] indicated by the difference between the input image Org[.] and the predicted image Pred[.] is generated (see step A6). This generation process is indicated by the following formula (4).

$$\forall(x,y) \in blk, \text{Res}[t,x,y] = \text{Org}[t,x,y] - \text{Pred}[t,x,y] \quad \text{Formula (4)}$$

After the prediction residual Res[.] is generated, the prediction residual encoder 104 encodes the prediction residual Res[.].

The prediction residual Res[.] can be encoded by any method. In an ordinary video encoding method, frequency conversion is performed by means of DCT (discrete cosine transform), quantization is then performed so as to binarize DCT coefficient information, and the binarized information is subjected to arithmetic encoding.

The encoded data of the prediction residual Res[.], generated as described above, is output from the video encoding apparatus 100, and also sent to the prediction residual decoder 105, which decodes the encoded data for the next prediction process (see step A8). The decoded prediction residual is represented by DecRes[.].

The prediction residual DecRes[.] decoded by the prediction residual decoder 105 is sent to the differential image decoder 106, which uses the predicted differential image PredDiff[.] so as to generate a decoded differential image DecDiff[.] (see step A9).

In the above process, clipping using the effective minimum and maximum values for the pixel value is performed so as to satisfy the following formula:

$$\min \leq \text{DecRes}[t,x,y] + \text{PredDiff}[t,x,y] + \text{Syn}[t,x,y] \leq \max$$

This clipping process can be indicated using the above-described function Clip, as the following formula (5).

$$\forall(x,y) \in blk, \text{DecDiff}[t,x,y] = \text{Clip}(\text{DecRes}[t,x,y] + \text{PredDiff}[t,x,y], \min - \text{Syn}[t,x,y], \max - \text{Syn}[t,x,y]) \quad \text{Formula (5)}$$

This clipping process may be executed or omitted. When executing it, the same process should be performed at both the encoder and decoder sides.

The decoded differential image DecDiff[.] generated by the differential image decoder 106 is stored in the differential image memory 107, and is used in a prediction process for encoding an unprocessed block (see step A10).

As described above, the video encoding apparatus 100 of Embodiment 1 generates a predicted signal for the differential image between the input image and the synthetic image, and encodes the input image by using the sum of the generated predicted differential image and the synthetic image as a predicted signal for the input image.

Figure 3:
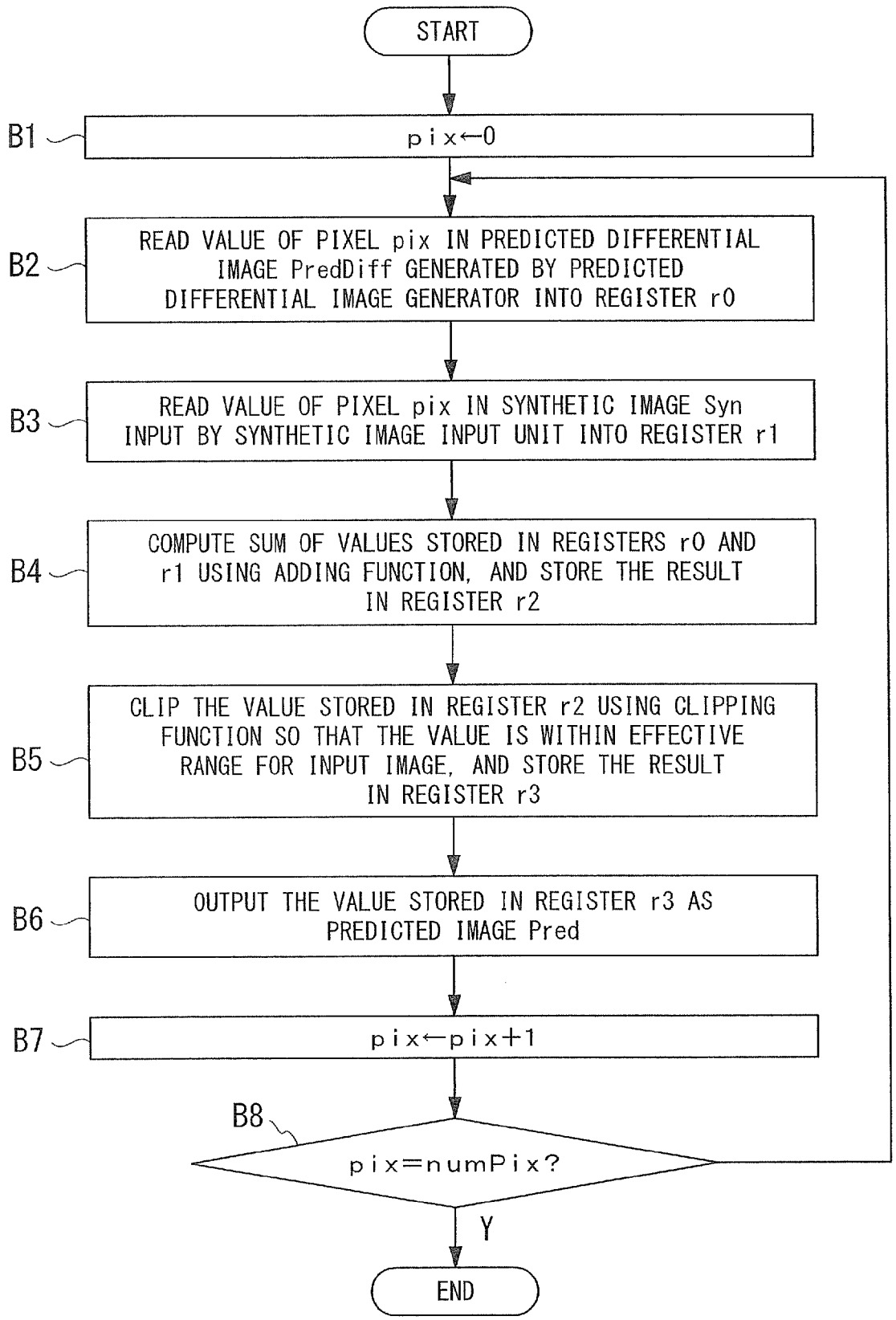
FIG. 3 is an operation flow of the process of generating a predicted image.

Below, in accordance with an operation flow of FIG. 3, the process of generating the predicted image Pred[.], executed in step A5 in the operation flow of FIG. 5, will be explained in detail.

The process (step A5) of generating the predicted image Pred[.] for the encoding target image is executed by the prediction image generator 103 for each pixel included in the relevant block. In order to execute this process, the prediction image generator 103 (see FIG. 1) has (i) an adding function of adding a pixel value of the synthetic image Syn[.] input by the synthetic image input unit 102 and the corresponding pixel value of the predicted differential image PredDiff[.] generated by the predicted differential image generator 108, and (ii) a clipping function of clipping the pixel value obtained by the above adding function.

The relevant process is applied to each pixel in the block. That is, when "pix" is an index for each pixel, after pix is initialized to zero (see step B1), the following process (steps B2 to B6) is repeatedly performed while pix is incremented by 1 (see step B7), until pix reaches numPix which indicates the number of pixels in the block (see step B8).

In the repeated process, first, the value of the pixel pix of the predicted differential image PredDiff[.] generated by the predicted differential image generator 108 is read into a register r0 (see step B2), and then the value of the pixel pix of the synthetic image Syn[.] input by the synthetic image input unit 102 is read into a register r1 (see step B3)

Next, addition between the pixel values stored in the registers r0 and r1 is executed using the above-described adding function. The result of the addition is stored in a register r2 (see step B4).

Next, the pixel value stored in the register r2 is subjected to clipping by using the above-described clipping function so that the pixel value has a value within an effective range for the input image. The result of the clipping is stored in a register r3 (see step B5). The effective range is determined based on the bit depth of the input image. For an 8-bit image, the minimum value is 0, and the maximum value is 255.

Next, the pixel value stored in the register r3 is output as the predicted image Pred[.] for the pixel pix in the encoding target image (see step B6).

Although registers are used in the above explanation, another structure using no register is possible. In addition, in steps B4 and B5, the result of each process is stored in an independent register. However, the result may be overwritten into the register r0. Additionally, if the addition can be performed using a single register, it is unnecessary to read the value of the synthetic image Syn[.] into the register r1, and direct addition may be executed. Also in the above-described flow, the predicted image Pred[.] for each pixel is output. However, the predicted image for all pixels may be output together by means of buffering.

Figure 4A:
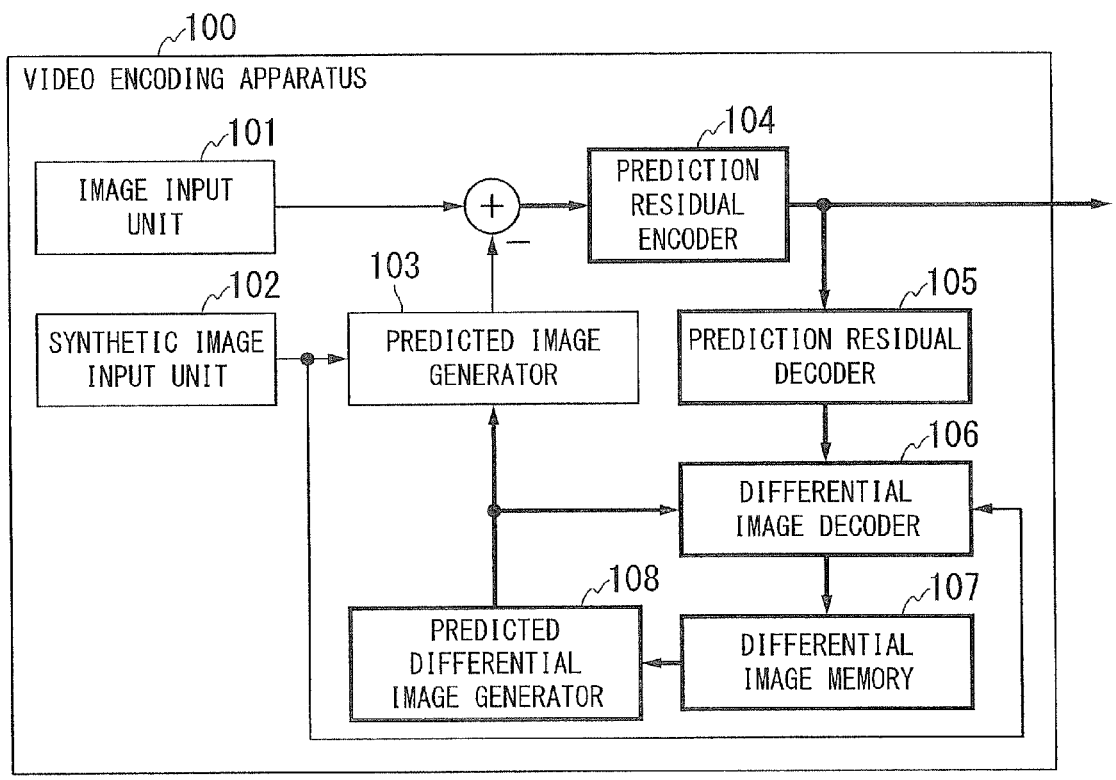
FIG. 4A is a diagram showing the video encoding apparatus of Embodiment 1 so as to explain a comparison between the video encoding apparatus of Embodiment 1 and a conventional video encoding apparatus for encoding a multi-viewpoint video image.
Figure 4B:
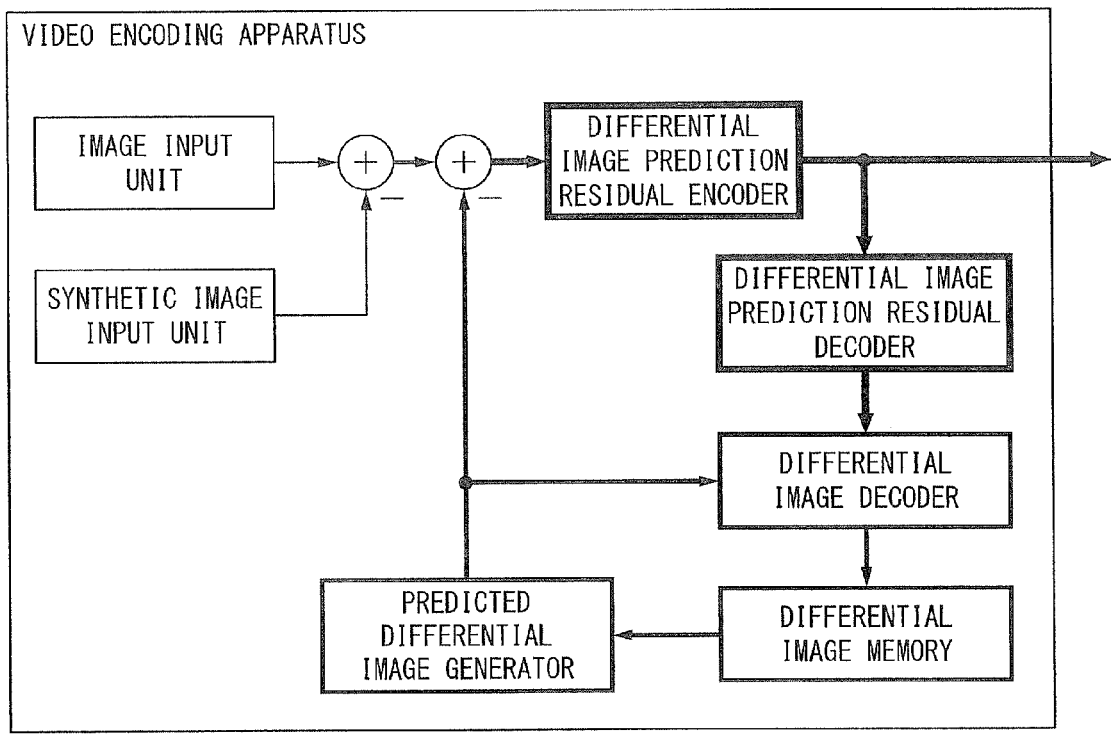
FIG. 4B is a diagram showing the conventional video encoding apparatus so as to explain the comparison.

FIGS. 4A and 4B are diagrams for comparing the video encoding apparatus 100 of Embodiment 1 with a conventional video encoding apparatus for encoding a multi-viewpoint video image.

FIG. 4A shows the structure of the video encoding apparatus 100 of Embodiment 1, and FIG. 4B shows the structure of the conventional video encoding apparatus for encoding a multi-viewpoint video image. In the figures, the thinnest lines indicate parts for processing N-bit data, the thicker lines indicate parts for processing (N+1)-bit data, and the thickest lines indicate parts for processing (N+2)-bit data.

In the video encoding apparatus 100 of Embodiment 1, a predicted signal for a differential image between an input image and a synthetic image therefor is generated, and the sum of the generated predicted differential image and the synthetic image is used as a predicted signal for the input image, so as to encode the difference between the input image and the predicted image therefore. In this case, subtraction computation is executed only once (see FIG. 4A), and thus encoding can be performed with a bit depth equal to that of an ordinary video encoding apparatus for encoding a video image.

In contrast, in a conventional video encoding apparatus for encoding a multi-viewpoint video image, a differential image between an input image and a synthetic image therefor is generated, and the generated differential image is subjected to video encoding. In this case, subtraction computation should be executed twice (see FIG. 4B), and thus the relevant bit depth is larger than that of an ordinary video encoding apparatus for encoding a video image.

In accordance with the above-described embodiment of the present invention, a predicted signal for a differential image between an input image and a synthetic image therefor is generated, and the sum of the generated predicted differential image and the synthetic image is used as a predicted signal for the input image. Therefore, efficient encoding using a differential image can be performed with a small circuit or equipment size.

Additionally, in the conventional technique, a differential image between an input image and a synthetic image therefor is generated, and the generated differential image is subjected to video encoding. Therefore, a useless signal may be encoded in an area where the pixel value is the maximum or minimum value within a permissive range. In contrast, in the embodiment of the present invention, the relevant pixel value is clipped to have the maximum or minimum value within a permissive range, and thus such a problem does not occur.

Embodiment 2

A second embodiment (called "Embodiment 2" below) will be explained below.

FIG. 5 shows the structure of a video encoding apparatus 200 for Embodiment 2 of the present invention.

As shown in FIG. 5, the video encoding apparatus 200 has an image input unit 201, a synthetic image input unit 202, a first predicted image generator 203, a second predicted image generator 204, a prediction residual encoder 205, a prediction residual decoder 206, an image decoder 207, a decoded image memory 208, a differential image memory 209, a predicted differential image generator 210, and a prediction selector switch 211.

The image input unit 201 inputs a (video) image, obtained by a camera as an encoding target, into the apparatus. The synthetic image input unit 202 inputs a synthetic (video) image for the camera into the apparatus.

The first predicted image generator 203 generates a predicted image for the input image, based on a prediction for a differential image (between the input image and the synthetic image). The first predicted image generator 203 performs an operation similar to that shown in FIG. 3, in which a predicted differential image (i.e., predicted image for the differential image) generated by the predicted differential image generator 210 and the synthetic image input by the synthetic image input unit 202 are added to each other together with a clipping operation, thereby generating a predicted image for the input image.

The second predicted image generator 204 generates a predicted image for the input image, based on a decoded image, that is, generates the predicted image, not using a differential image, but using a decoded image stored in the decoded image memory 208.

The prediction residual encoder 205 encodes a prediction residual between the input image input by the input unit 201 and the predicted image generated by the first predicted image generator 203 or the second predicted image generator 204, and outputs encoded data. The prediction residual decoder 206 decodes the prediction residual encoded by the prediction residual encoder 205.

The image decoder 207 generates a decoded image by adding the prediction residual decoded by the prediction residual decoder 206 and the predicted image generated by the first predicted image generator 203 or the second predicted image generator 204 to each other. The decoded image memory 208 stores the decoded image generated by the image decoder 207.

The differential image memory 209 stores a differential image represented by a difference between the decoded image obtained by the image decoder 207 and the synthetic image input by the synthetic image input unit 202.

The predicted differential image generator 210 generates a predicted differential image, that is, a predicted image for a differential image represented by a difference between the input image and the synthetic image, by using the differential image stored in the differential image memory 209.

The prediction selector switch 211 selects and outputs one of the predicted image generated by the first predicted image generator 203 and the predicted image generated by the second predicted image generator 204.

Figure 6:
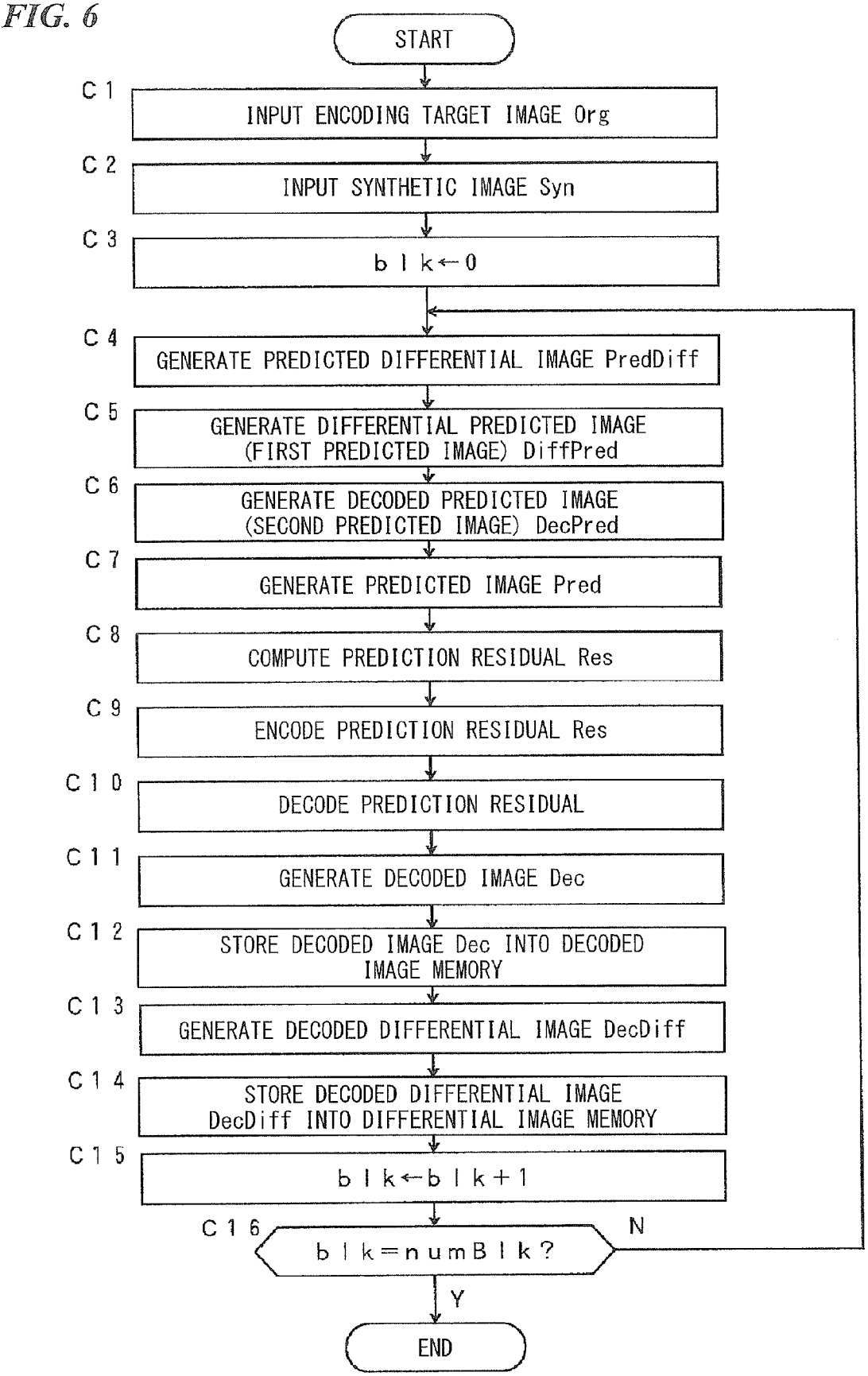
FIG. 6 is an operation flow performed by the video encoding apparatus of Embodiment 2.

FIG. 6 shows an operation flow performed by the video encoding apparatus 200 of Embodiment 2, which has the above-described structure.

The operation flow shows an operation performed when encoding an image at a target time, by using the video encoding apparatus 200 of Embodiment 2. When encoding a plurality of frames, the relevant operation flow is repeatedly executed.

Below, in accordance with the operation flow, the operation performed by the video encoding apparatus 200 of Embodiment 2 will be explained in detail. Here, symbols used in the above-described Embodiment 1 are also used in the following explanation.

In the video encoding apparatus 200 of Embodiment 2, first, the image input unit 201 input an encoding target image Org[.] into the apparatus (see step C1), and the synthetic image input unit 102 inputs a synthetic image Syn[.], which corresponds to the input image Org[.], into the apparatus (see step C2).

Also, in Embodiment 2, the entire image is divided into a plurality of blocks, and an operation is repeatedly applied to each block so as to encode the entire image. Here, division form is not limited to a block, and any division form can be employed. Furthermore, no division is also possible. In the following explanation, similar to Embodiment 1, "blk" is an index for each block, and numBlk indicates the number of blocks included in an image.

Therefore, after blk is initialized to zero (see step C3), the following process (steps C4 to C14) is repeatedly performed so as to perform encoding while blk is incremented by 1 (see step C15), until blk reaches numBlk (see step C16).

In the process repeated for each block, first, a predicted image is generated. In the present Embodiment 2, the first predicted image generator 203 generates a predicted image by using a differential image (the predicted image is indicted by "differential predicted image DiffPred[.]", and the second predicted image generator 204 generates a predicted image, by using no differential image but a decoded image (the predicted image is indicted by "decoded predicted image DecPred[.]". By using the predicted images, a single predicted image is generated.

In the generation of the differential predicted image DiffPred[.], first, the predicted differential image generator 210 generates a predicted differential image PredDiff[.] by using data (stored in the differential image memory 209) of an already-encoded frame at a time different from the target time or an already-encoded block in the encoding target frame (see step C4). Next, the first predicted image generator 203 generates a differential predicted image DiffPred[.] which is indicated by the sum of the predicted differential image PredDiff[.] and the synthetic image Syn[.] (see step C5).

In the above operation, each pixel value is clipped to be within an effective range. The effective range for the pixel value is determined in accordance with the bit depth of the input image. For an eight-bit image, the minimum value is 0, and the maximum value is 255. The clipping process is indicated by the following formula (6). The processes executed in steps C4 and C5 are respectively equal to those executed in steps A4 and A5 of Embodiment 1.

$$\forall (x,y) \in blk, \text{DiffPred}[t,x,y] = \text{Clip}(\text{PredDiff}[t,x,y] + \text{Syn}[t,x,y], \min, \max) \quad \text{Formula (6)}$$

The generation of the decoded predicted image DecPred[.] is performed by the second predicted image generator 204, by using the decoded image Dec[.] (stored in the decoded image memory 208) of an already-encoded frame at a time different from the target time or an already-encoded block in the encoding target frame (see step C6).

The decoded predicted image DecPred[.] may be generated by any method used in a known video encoding system as shown in the above-described Non-Patent Document 1.

For example, as shown in the following formula (7), an area in another frame at a different time may be designated and a value of the area may be used as a predicted value. In another example, as shown in the following formula (8), a directional prediction based on already-encoded peripheral pixels in the same frame at the target time may be performed.

$$\forall (x,y) \in blk, \text{DecPred}[t,x,y] = \text{Dec}[t(1,x+mv_x,y+mv_y] \quad \text{Formula (7)}$$

$$\forall (x,y) \in blk, \text{DecPred}[t,x,y] = \text{Dec}[t,x,\text{up\_line}] \quad \text{Formula (8)}$$

In the present Embodiment 2, the predicted image is generated using prediction selector switch 211 for selecting one of the differential predicted image DiffPred[.] generated by the first predicted image generator 203 and the decoded predicted image DecPred[.] generated by the second predicted image generator 204 (see step C7). In another method, the predicted image may by generated using an average between corresponding pixels.

The selection between the above two predicted images may be performed by any method. For example, the predicted images may be encoded first, and one of them which has a higher degree of encoding efficiency may be selected. In another example, the prediction efficiency for the encoding target image Org[.] may be measured by means of the sum of absolute differences or the sum of squared differences, and one of the predicted images which has a higher degree of prediction efficiency may be selected.

Additionally, in accordance with each input image, switching may be appropriately performed for each frame, each small area or block in a frame, or the like.

After the predicted image is generated, a prediction residual Res[.], which is represented by a difference between the input image Org[.] and the predicted image output by the prediction selector switch 211, is generated (see step C8). The process of generating Res[.] is represented by the above-described formula (4).

After the prediction residual Res[.] is generated, the prediction residual encoder 205 encodes the prediction residual Res[.] (see step C9), where the encoding may be executed by any method.

The generated encoded data of the prediction residual Res [.] is output from the video encoding apparatus 200, and simultaneously, transmitted to the prediction residual decoder 206. The prediction residual decoder 206 decodes the encoded data so that the decoded data is used in future prediction (see step C10).

The prediction residual DecRes[.] decoded in the prediction residual decoder 206 is transmitted to the image decoder 207, where a decoded image Dec[.] is generated using a predicted image output from the prediction selector switch 211 (see step C11).

In this process, a clipping operation using an effective maximum pixel value and an effective minimum pixel value is performed. This operation is represented by the following formula (9).

$$\forall(x,y)\in blk, Dec[t,x,y]=Clip(DecRes[t,x,y]+Pred[t,x,y], min, max) \quad \text{Formula (9)}$$

The decoded image Dec[.] generated by the image decoder 207 is stored in the decoded image memory 208, and is used in a prediction process for encoding an unprocessed block (see step C12).

In addition, a decoded differential image DecDiff[.] is generated using the decoded image Dec[(] and the synthetic image Syn[.] in accordance with the following formula (10) (see step C13).

$$\forall(x,y)\in blk, DecDiff[t,x,y]=Dec[t,x,y]-Syn[t,x,y] \quad \text{Formula (10)}$$

The generated decoded differential image DecDiff[.] is stored in the differential image memory 209, and is used in a prediction process for encoding an unprocessed block (see step C14).

As described above, the video encoding apparatus 200 of Embodiment 2 generates a predicted signal for a differential image between an input image and a synthetic image, and encodes the input image by using a predicted signal (for the input image) which is the sum of the generated predicted differential image and the synthetic image.

Figure 7A:
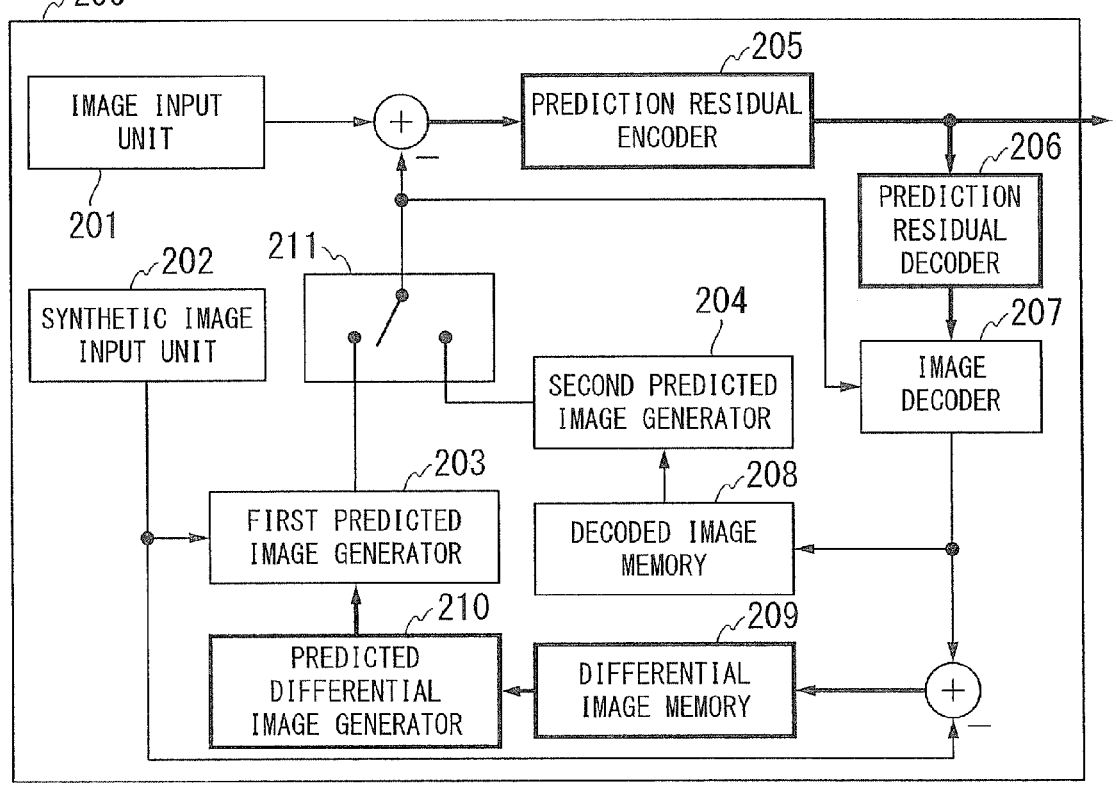
FIG. 7A is a diagram showing the video encoding apparatus of Embodiment 2 so as to explain a comparison between the video encoding apparatus of Embodiment 2 and a conventional video encoding apparatus for encoding a multi-viewpoint video image.
Figure 7B:
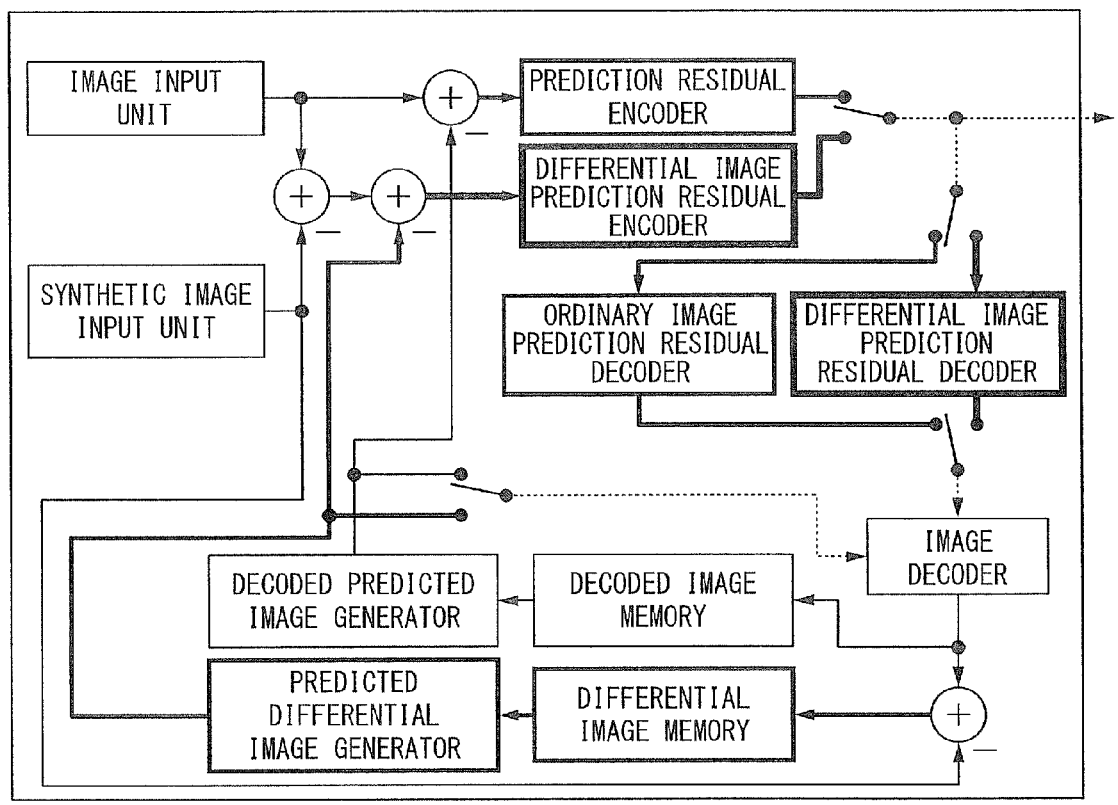
FIG. 7B is a diagram showing the conventional video encoding apparatus so as to explain the comparison.

FIGS. 7A and 7B are diagrams for comparing the video encoding apparatus 200 of Embodiment 2 with a corresponding conventional video encoding apparatus for encoding a multi-viewpoint video image.

FIG. 7A shows the structure of the video encoding apparatus 200 of Embodiment 2, and FIG. 7B shows the structure of the corresponding conventional video encoding apparatus for encoding a multi-viewpoint video image. In the figures, the thinnest lines indicate parts for processing N-bit data, the thicker lines indicate parts for processing (N+1)-bit data, the thickest lines indicate parts for processing (N+2)-bit data, and broken lines indicate parts where the bit for processing can be switchably selected.

The video encoding apparatus 200 of Embodiment 2 generates a predicted signal for a differential image between an input video image and a synthetic video image for the input video image. The video encoding apparatus 200 encodes a difference between the input video image and a predicted video image therefor by using a predicted signal (for the input video image) which is the sum of the generated predicted differential image and the synthetic image. In this case, subtraction computation is executed only once (see FIG. 7A), and thus encoding can be performed with a bit depth equal to that of an ordinary video encoding apparatus for encoding a video image.

In contrast, in a conventional video encoding apparatus for encoding a multi-viewpoint video image, a differential image between an input image and a synthetic image therefor is generated, and the generated differential image is subjected to video encoding. In this case, subtraction computation should be executed twice (see FIG. 7B), and thus the relevant bit depth is larger than that of an ordinary video encoding apparatus for encoding a video image.

In addition, as understood by comparing FIG. 7A with 7B, in the video encoding apparatus 200 of Embodiment 2, in both cases of prediction on a differential video image and prediction on an input video image, the input signal handled by the relevant encoder is the input video signal, and the predicted signal is an predicted video image for the input video image. Therefore, encoding can be performed using the same input signal and encoder in both cases.

Embodiment 3

A third embodiment (called "Embodiment 3" below) will be explained below.

Figure 8:
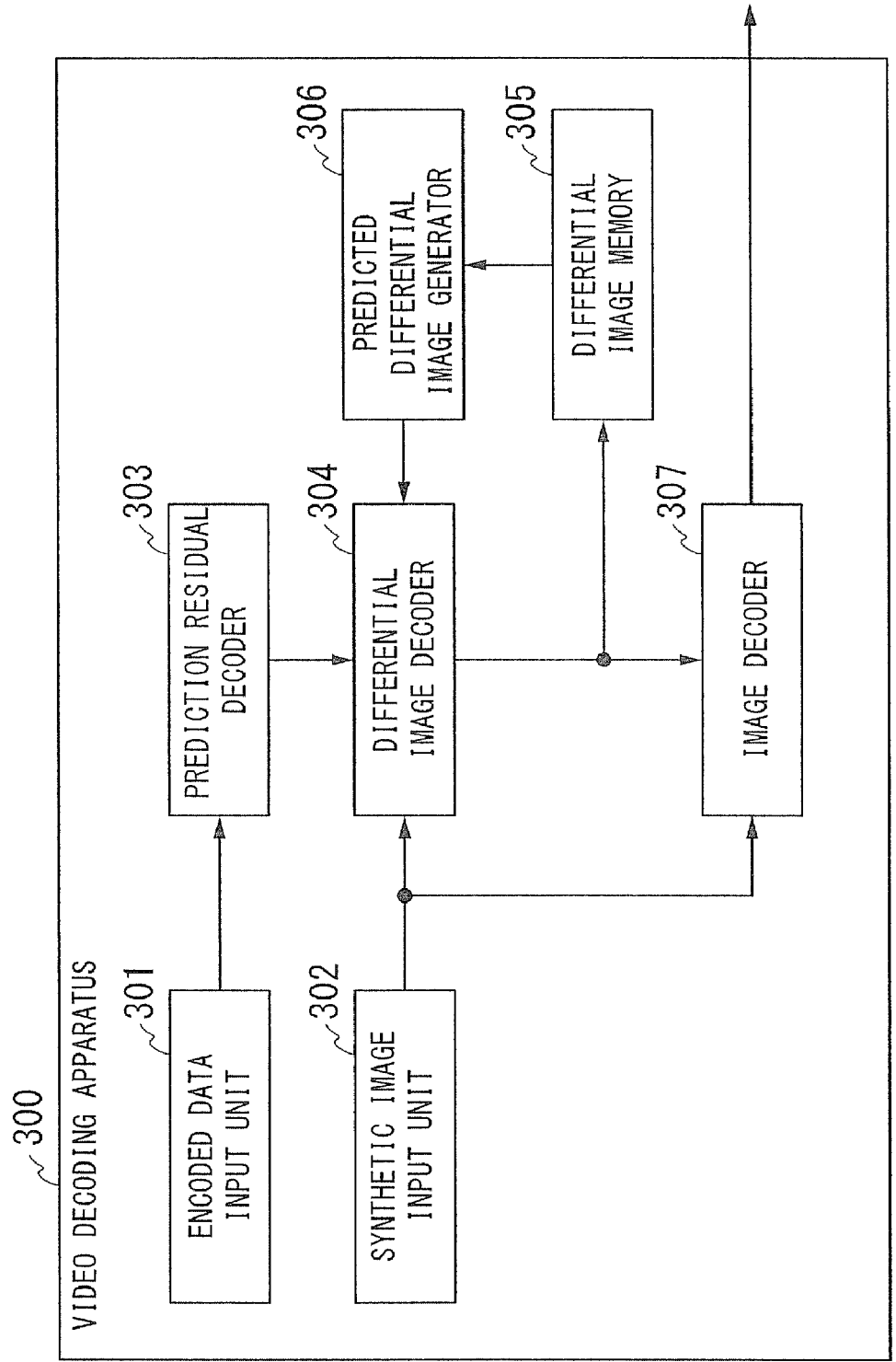
FIG. 8 is a diagram showing the structure of a video decoding apparatus of Embodiment 3 in accordance with the present invention.

FIG. 8 shows the structure of a video decoding apparatus 300 for Embodiment 3 of the present invention.

As shown in FIG. 8, the video decoding apparatus 300 of Embodiment 3 has an encoded data input unit 301, a synthetic image input unit 302, a prediction residual decoder 303, a differential image decoder 304, a differential image memory 305, a predicted differential image generator 306, and an image decoder 307.

The encoded data input unit 301 inputs encoded data generated by the video encoding apparatus 100 of Embodiment 1 (i.e., encoded data of a video image obtained by a camera as a decoding target) into the apparatus. The synthetic image input unit 302 inputs a synthetic (video) image (i.e., a disparity-compensated image) for the camera. The prediction residual decoder 303 decodes a prediction residual included in the encoded data.

The differential image decoder 304 adds a predicted differential image (i.e., a predicted image for a differential image between a decoding target image and the synthetic image) generated by the predicted differential image generator 306 and the prediction residual decoded by the prediction residual decoder 303 while determining a processing range based on the synthetic image input by the synthetic image input unit 302, thereby generating a differential image indicated by the difference between the decoding target image and the synthetic image. The differential image memory 305 stores the differential image generated by the differential image decoder 304.

The predicted differential image generator 306 uses the differential image stored in the differential image memory 305 so as to generate a predicted differential image which is a predicted image for the differential image indicated by the difference between the decoding target image and the synthetic image.

The image decoder 307 decodes the decoding target image by adding the differential image generated by the differential image decoder 304 and the synthetic image input by the synthetic image input unit 302.

Figure 9:
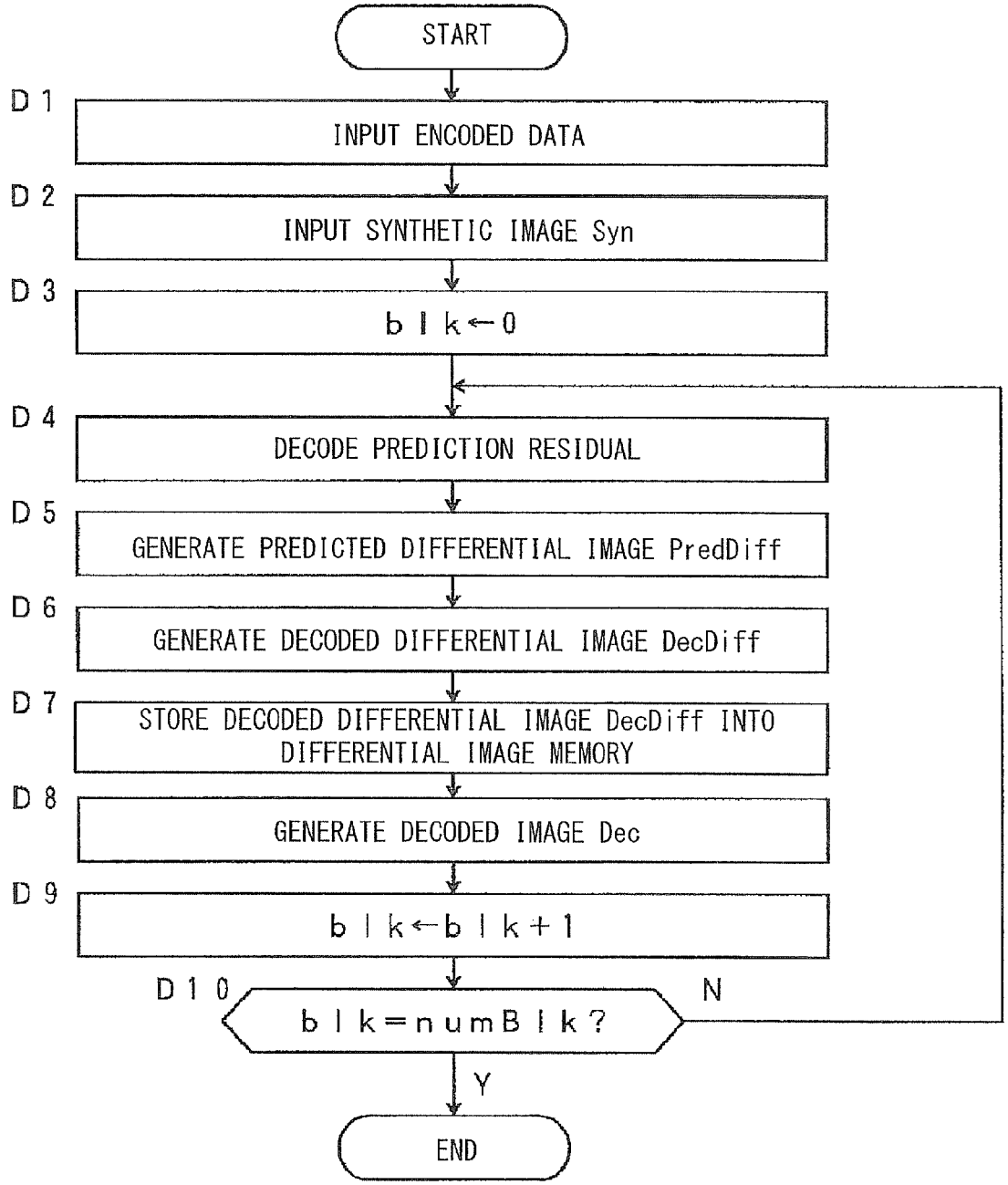
FIG. 9 is an operation flow performed by the video decoding apparatus of Embodiment 3.

FIG. 9 shows an operation flow performed by the video decoding apparatus 300 of Embodiment 3, which has the above-described structure.

The operation flow shows an operation performed when decoding encoded data of an image at a target time, by using the video decoding apparatus 300 of Embodiment 3. When decoding a plurality of frames, the relevant operation flow is repeatedly executed.

Below, in accordance with the operation flow, the operation performed by the video decoding apparatus 300 of Embodiment 3 will be explained in detail. Here, symbols used in the above-described Embodiments 1 and 2 are also used in the following explanation.

In the video decoding apparatus 300 of Embodiment 3, first, the encoded data input unit 301 input encoded data of a decoding target image into the apparatus (see step D1). Next, the synthetic image input unit 302 inputs a synthetic image, which corresponds to the decoding target image, into the apparatus (see step D2).

In Embodiment 3, it is assumed that the entire image has been divided into a plurality of blocks, and each block has been encoded. Therefore, an operation is repeatedly applied to each block so as to decode the entire image. Here, division form is not limited to a block, and any division form can be employed. Furthermore, no division is also possible. In the following explanation, "blk" is an index for each block, and numBlk indicates the number of blocks included in an image.

Therefore, after blk is initialized to zero (see step D3), the following process (steps D4 to D8) is repeatedly performed so as to perform decoding while blk is incremented by 1 (see step D9), until blk reaches numBlk (see step D10).

In the process repeated for each block, first, the prediction residual decoder 303 decodes a prediction residual included in the input encoded data (see step D4).

Next, the predicted differential image generator 306 generates a predicted differential image by using data (stored in the differential image memory 305) of an already-decoded frame at a time different from the target time or an already-decoded block in the decoding target frame (see step D5).

If there are a plurality of methods for generating the predicted differential image, one of the generating methods is specified using information which is included in the encoded data and indicates a prediction method used in the corresponding encoding of block "blk". The predicted differential image is generated based on the specified method.

After the predicted differential image is generated by the predicted differential image generator 306, the differential image decoder 304 generates a decoded differential image represented by the sum of the generated predicted differential image and the decoded prediction residual (see step D6).

In this process, a clipping operation using an effective maximum pixel value and an effective minimum pixel value is performed, where this operation is equal to the clipping (represented by the above-described formula (5)) performed in step A9 of Embodiment 1. However, the clipping operation may or may not be performed. If it is performed, the same processing must be executed at both the encoder and decoder sides.

The decoded differential image generated by the differential image decoder 304 is stored in the differential image memory 305, and is used in the predicted differential image generation performed for decoding an unprocessed block (see step D7).

After the decoded differential image is generated by the differential image decoder 304, the image decoder 307 generates a decoded image represented by the sum of the decoded differential image and the synthetic image (see step D8).

In this process, each pixel value is clipped to have a value within an effective range. If clipping was executed in step D6, no clipping is necessary here. The clipping process is indicated by the following formula (11).

$$\forall (x,y) \in blk, Dec[t,x,y] = Clip(DecDiff[t,x,y] + Syn[t,x,y], min, max) \quad \text{Formula (11)}$$

The generated decoded image is output from the video decoding apparatus 300. In the present Embodiment 3, the decoded image is immediately output. However, if no appropriate display timing can be obtained through an operation from the encoding to the decoding, the decoded image may be stored in a buffer and output from the video decoding apparatus 300 at an appropriate display time.

In the operation flow of FIG. 9, a prediction residual of the decoding target image, which is included in the encoded data, is decoded, and a predicted image for a differential image of a decoding target area is generated using a differential image represented by a difference between an image of an already-decoded area in the decoding target image and the corresponding synthetic image. The generated predicted differential image is added to the decoded prediction residual so that a decoded differential image is obtained. The decoded differential image is added to the synthetic image, so that the decoded image is obtained. However, the processing for generating the decoded image is not limited to the above.

That is, in another operation for obtaining the decoded image, a prediction residual of the decoding target image, which is included in the encoded data, is decoded, and a predicted image for a differential image of a decoding target area is generated using a differential image represented by a difference between an image of an already-decoded area in the decoding target image and the corresponding synthetic image. The generated predicted differential image is added to the synthetic image so that a predicted image for the decoding target image is obtained. The predicted image for the decoding target image is added to the decoded prediction residual, so that the decoded image is obtained.

Embodiment 4

A fourth embodiment (called "Embodiment 4" below) will be explained below.

Figure 10:
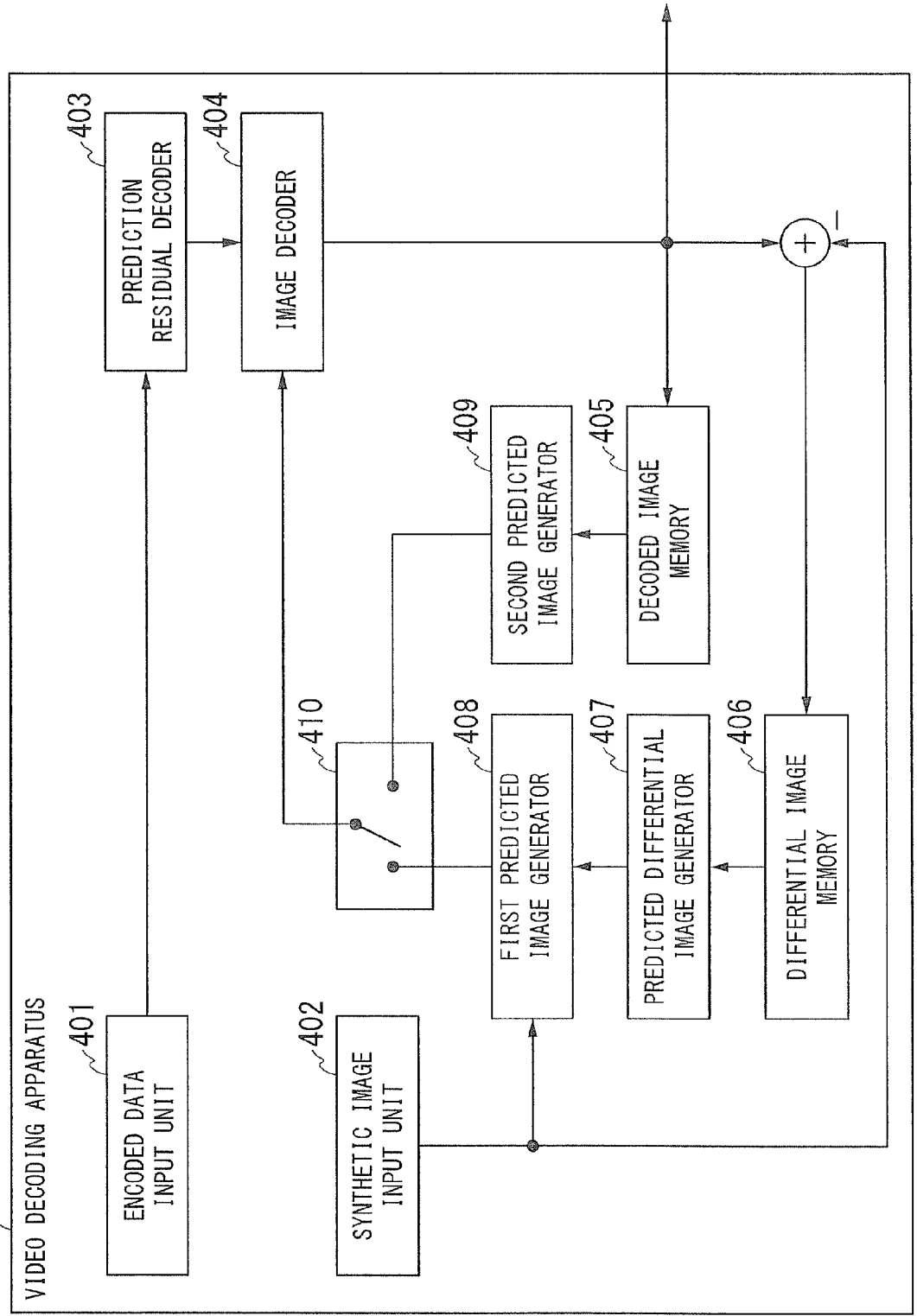
FIG. 10 is a diagram showing the structure of a video decoding apparatus of Embodiment 4 in accordance with the present invention.
Figure 11:
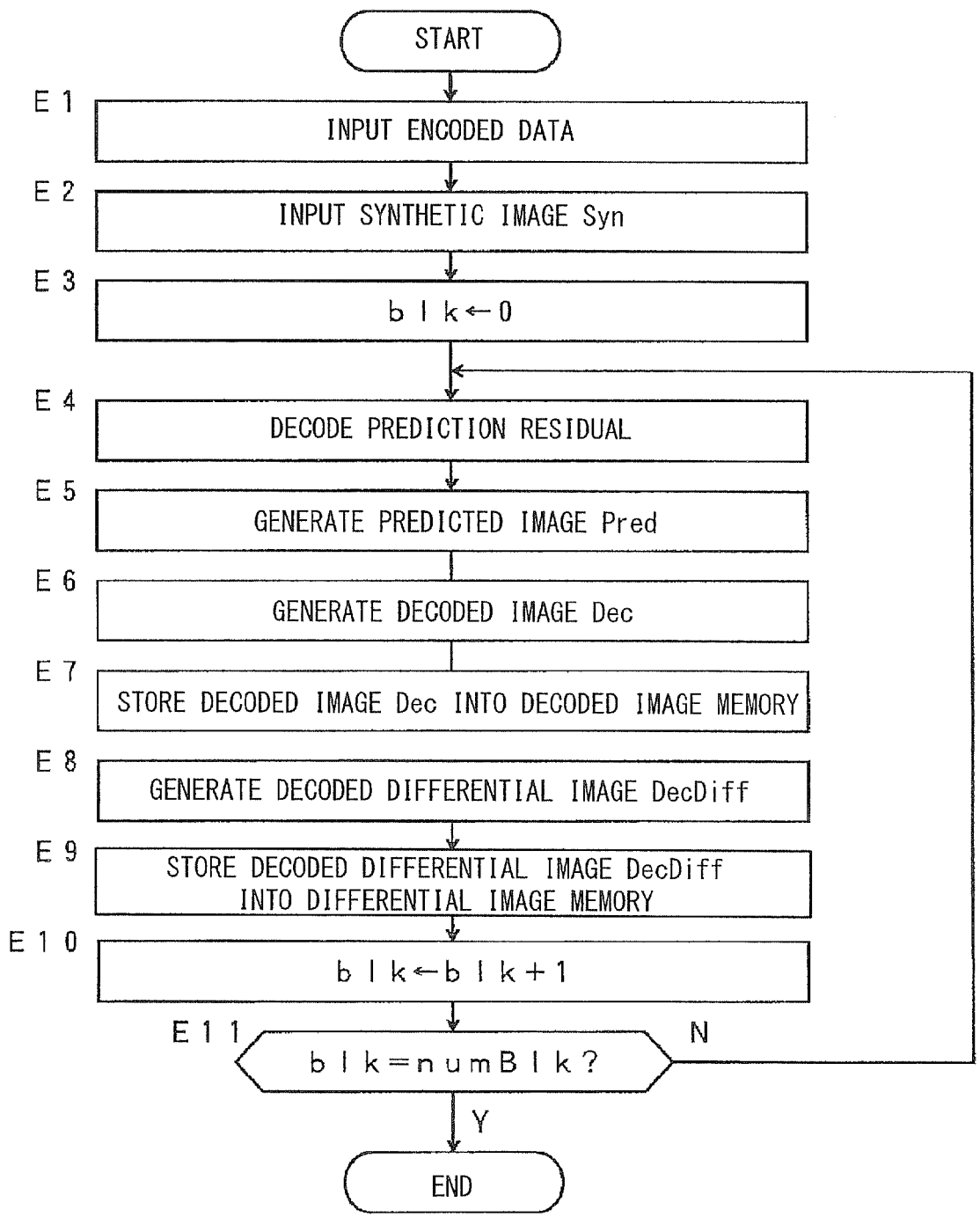
FIG. 11 is an operation flow performed by the video decoding apparatus of Embodiment 4.
Figure 12:
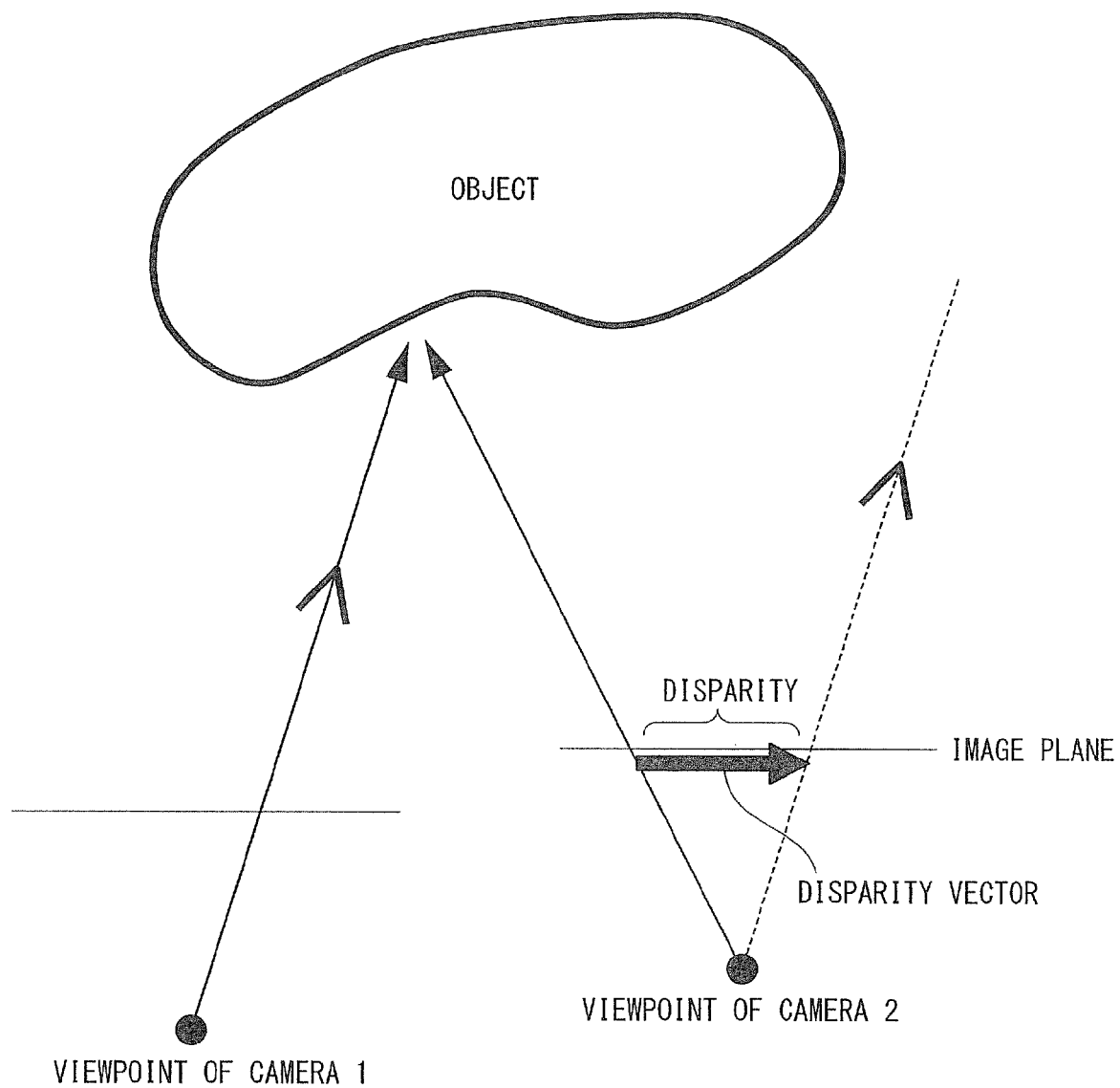
FIG. 12 is a schematic diagram for explaining disparity generated between cameras.

FIG. 10 shows the structure of a video decoding apparatus 400 for Embodiment 4 of the present invention.

As shown in FIG. 10, the video decoding apparatus 400 of Embodiment 4 has an encoded data input unit 401, a synthetic image input unit 402, a prediction residual decoder 403, an image decoder 404, a decoded image memory 405, a differential image memory 406, a predicted differential image generator 407, a first predicted image generator 408, a second predicted image generator 409, and a prediction selector switch 410.

The encoded data input unit 401 inputs encoded data generated by the video encoding apparatus 200 of Embodiment 2 (i.e., encoded data of a video image obtained by a camera as a decoding target) into the apparatus. The synthetic image input unit 402 inputs a synthetic (video) image for the camera. The prediction residual decoder 403 decodes a prediction residual included in the encoded data.

The image decoder 404 decodes a decoding target image by adding the prediction residual decoded by the prediction residual decoder 403 to a predicted image generated by the first predicted image generator 408 or the second predicted image generator 409. The decoded image memory 405 stores the decoded image generated by the image decoder 404.

The differential image memory 406 stores a (decoded) differential image represented by a difference between the decoded image generated by the image decoder 404 and the synthetic image input by the synthetic image input unit 402.

The predicted differential image generator 407 uses the differential image stored in the differential image memory 406 so as to generate a predicted differential image, which is a predicted image for a differential image represented by a difference between the decoding target image and the synthetic image.

The first predicted image generator 408 generates a predicted image for the decoding target image by adding the predicted differential image generated by the predicted differential image generator 407 and the synthetic image input by the synthetic image input unit 402.

The second predicted image generator 409 generates a predicted image for the decoding target image based on the decoded image stored in the decoded image memory 405.

The prediction selector switch 410 selects and outputs one of the predicted image generated by the first predicted image generator 408 and the predicted image generated by the second predicted image generator 409.

FIG. 6 shows an operation flow performed by the video decoding apparatus 400 of Embodiment 4, which has the above-described structure.

The operation flow shows an operation performed when decoding encoded data of an image at a target time, by using the video decoding apparatus 400 of Embodiment 4. When decoding a plurality of frames, the relevant operation flow is repeatedly executed.

Below, in accordance with the operation flow, the operation performed by the video decoding apparatus 400 of Embodiment 4 will be explained in detail. Here, symbols used in the above-described Embodiments 1 to 3 are also used in the following explanation.

In the video decoding apparatus 400 of Embodiment 4, first, the encoded data input unit 401 input encoded data of a decoding target image into the apparatus (see step E1). Next, the synthetic image input unit 402 inputs a synthetic image, which corresponds to the decoding target image, into the apparatus (see step E2).

In Embodiment 4, it is assumed that the entire image has been divided into a plurality of blocks, and each block has been encoded. Therefore, an operation is repeatedly applied to each block so as to decode the entire image. Here, division form is not limited to a block, and any division form can be employed. Furthermore, no division is also possible. In the following explanation, "blk" is an index for each block, and numBlk indicates the number of blocks included in an image.

Therefore, after blk is initialized to zero (see step E3), the following process (steps E4 to E9) is repeatedly performed so as to perform decoding while blk is incremented by 1 (see step E10), until blk reaches numBlk (see step E11).

In the process repeated for each block, first, the prediction residual decoder 403 decodes a prediction residual included in the input encoded data (see step E4).

Next, the first predicted image generator 408 generates a predicted image by using a decoded differential image (stored in the differential image memory 406) of an already-decoded frame at a time different from the target time or an already-decoded block in the decoding target frame, and the second predicted image generator 409 generates a predicted image by using a decoded image (stored in the decoded image memory 405) of an already-decoded frame at a time different from the target time (see step E5).

In the above process, a predicted image generating method applied to each block is determined by a specific method. That is, the determination may be performed using information about an already-decoded image or block, or information which is included in the encoded data and designates a prediction method. Additionally, the determination method decided by the video encoding apparatus should be used.

In Embodiment 4, the prediction method is switched using the prediction selector switch 410 between the prediction using a differential image, which is executed by the first predicted image generator 408, and the prediction using no differential image, which is executed by the second predicted image generator 409.

When performing the prediction (executed by the first predicted image generator 408) using a differential image, first, the predicted differential image generator 407 generates a predicted differential image by using a differential image stored in the differential image memory 406. Next, the first predicted image generator 408 generates a predicted image represented by the sum of the predicted differential image and the synthetic image. The generated predicted image functions as a predicted image for the decoding target image.

In the above operation, a clipping operation using an effective maximum pixel value and an effective minimum pixel value is performed, where this operation is equal to the clipping (represented by the above-described formula (6)) performed in steps C4 and C5 of Embodiment 2. However, the clipping operation may be or may not be performed. If it is performed, the same processing must be executed on both the encoder and decoder sides.

When performing the prediction (executed by the second predicted image generator 409) using no differential image, the second predicted image generator 409 generates a predicted image by using a decoded image stored in the decoded image memory 405, and the generated predicted image functions as a predicted image for the decoding target image. This operation is equal to that performed in step C6 of Embodiment 2.

The present Embodiment 4 has the second predicted image generator 409 and the predicted differential image generator 407. If both generators use a common prediction method, they can be integrated as a single predicted image generator, where the image memory for supplying an image to the generator should be switchably selected. In such a case, the signal output from the predicted image generator should be input into the first predicted image generator 408 only when performing the prediction using a differential image. Accordingly, two switches which cooperate with each other are required.

After the predicted image is generated using the first predicted image generator 408 or the second predicted image generator 409, the image decoder 404 generates a decoded image represented by the sum of the generated predicted image and the prediction residual decoded by the prediction residual decoder 403 (see step E6).

In the above operation, each pixel value is clipped to be within an effective range. This clipping operation is equal to that executed in step C11 of Embodiment 2, and is represented by the above-described formula (9).

The generated decoded image is stored in the decoded image memory 405, and is used in the predicted image generation for decoding an unprocessed block (see step E7).

The decoded image and the synthetic image are used for generating a decoded differential image in accordance with the above-described formula (10) (see step E8). The generated decoded differential image is stored in the differential image memory 406, and is used in the predicted image generation for decoding an unprocessed block (see step E9).

The decoded image generated in step E6 is output from the video decoding apparatus 400. In Embodiment 4, the decoded image is immediately output. However, if no appropriate display timing can be obtained through an operation from the encoding to the decoding, the decoded image may be stored in a buffer and output from the video decoding apparatus 400 at an appropriate display time.

INDUSTRIAL APPLICABILITY

The present invention can be applied to multi-viewpoint video image encoding, and efficient encoding using a differential video image can be performed with a small circuit or equipment size.

The invention claimed is:

1. A video encoding apparatus used in encoding of a multi-viewpoint image obtained by cameras having different viewpoints, wherein the apparatus generates a synthetic image for a camera used for obtaining an encoding target image, by using at least one already-encoded reference camera image having a viewpoint different from the viewpoint of the camera used for obtaining the encoding target image, and disparity information between the reference camera image and the encoding target image, encodes the encoding target image by using the synthetic image, and comprises:
    a differential image prediction device that generates a predicted image for a differential image between an input image of an encoding target area to be encoded and the synthetic image generated therefor;
    a predicted image generation device that generates a predicted image for the encoding target area, where the predicted image is represented by the sum of the predicted differential image generated by the differential image prediction device and the synthetic image for the encoding target area; and
    a prediction residual encoding device that encodes a prediction residual represented by a difference between the predicted image for the encoding target area generated by the predicted image generation device and the encoding target image of the encoding target area.

2. The video encoding apparatus in accordance with claim 1, wherein:
    the differential image prediction device generates the predicted image for the differential image with respect to the encoding target area, by using a differential image at a time which is the same as the time when the encoding target image was obtained, where the used differential image is represented by a difference between a decoded image of an already-encoded area in the encoding target image and the synthetic image for the already-encoded area.

3. The video encoding apparatus in accordance with claim 1, wherein:
    the differential image prediction device generates the predicted image for the differential image with respect to the encoding target area, by using a differential image at a time different from the time when the encoding target image was obtained, where the used differential image is represented by a difference between a decoded image of an already-encoded image which was obtained at the viewpoint used for obtaining the encoding target image and the synthetic image at the same time as the time of the decoded image.

4. The video encoding apparatus in accordance with claim 1, further comprising:
    an image decoding device that generates a decoded image of the encoding target image by decoding encoded data of the encoding target image; and
    a decoded differential image generation and storage device that generates a decoded differential image represented by a difference between the decoded image generated by the image decoding device and the synthetic image, and stores the generated decoded differential image into a storage memory,
    wherein the differential image prediction device generates the predicted image for the differential image with respect to the encoding target area, by using the decoded differential image stored in the storage memory.

5. The video encoding apparatus in accordance with claim 1, further comprising:
    a prediction residual decoding device that decodes the prediction residual encoded by the prediction residual encoding device; and
    a decoded differential image generation and storage device that generates a decoded differential image represented by the sum of the decoded prediction residual generated by the prediction residual decoding device and the predicted differential image, and stores the generated decoded differential image into a storage memory,
    wherein the differential image prediction device generates the predicted image for the differential image with respect to the encoding target area, by using the decoded differential image stored in the storage memory.

6. The video encoding apparatus in accordance with claim 5, wherein:
    the decoded differential image generation and storage device performs clipping so that each pixel of the decoded differential image has a pixel value within a predetermined effective range.

7. The video encoding apparatus in accordance with claim 1, further comprising:
    an original image prediction device that generates a predicted image for the encoding target image, by using any one of a decoded image of an already-encoded area in the encoding target image and a decoded image of an already-encoded image which was obtained at the same viewpoint as that used for obtaining the encoding target image and at a time different from the time of the encoding target image,
    wherein the predicted image generation device selectively performs one of generation of the predicted image for the encoding target image based on the predicted differential image and the synthetic image and generation of the predicted image for the encoding target image by directly using the predicted image generated by the original image prediction device.

8. The video encoding apparatus in accordance with claim 1, wherein:
    the predicted image generation device performs clipping so that each pixel of the predicted image has a pixel value within a predetermined effective range.

9. A video decoding apparatus used in decoding of encoded data of a multi-viewpoint image obtained by cameras having different viewpoints, wherein the apparatus generates a synthetic image for a camera used for obtaining a decoding target image, by using at least one already-decoded reference camera image having a viewpoint different from the viewpoint of the camera used for obtaining a decoding target image, and disparity information between the reference camera image and the decoding target image, decodes encoded data of the decoding target image by using the synthetic image, and comprises: a prediction residual decoding device that decodes a prediction residual of the decoding target image, where the prediction residual is included in the encoded data; a differential image prediction device that generates a predicted image for a differential image between a decoding target image of a decoding target area to be decoded and the synthetic image generated therefor; and an image decoding device that decodes the decoding target image by adding the predicted differential image generated by the differential image prediction device, the prediction residual decoded by the prediction residual decoding device, and the synthetic image.

10. The video decoding apparatus in accordance with claim 9, wherein:
the differential image prediction device generates the predicted image for the differential image with respect to the decoding target area, by using a differential image at a time which is the same as the time when the decoding target image was obtained, where the used differential image is represented by a difference between a decoded image of an already-decoded area in the decoding target image and the synthetic image for the already-decoded area.

11. The video decoding apparatus in accordance with claim 9, wherein:
the differential image prediction device generates the predicted image for the differential image with respect to the decoding target area, by using a differential image at a time different from the time when the decoding target image was obtained, where the used differential image is represented by a difference between an already-decoded reference image which was obtained at the viewpoint used for obtaining the decoding target image and the synthetic image at the same time as the time of the reference image.

12. The video decoding apparatus in accordance with claim 9, further comprising:
a decoded differential image generation and storage device that generates a decoded differential image represented by a difference between the decoded image generated by the image decoding device and the synthetic image, and stores the generated decoded differential image into a storage memory,
wherein the differential image prediction device generates the predicted image for the differential image with respect to the decoding target area, by using the decoded differential image stored in the storage memory.

13. The video decoding apparatus in accordance with claim 9, further comprising:
a decoded differential image generation and storage device that generates a decoded differential image represented by the sum of the decoded prediction residual generated by the prediction residual decoding device and the predicted differential image, and stores the generated decoded differential image into a storage memory,
wherein the differential image prediction device generates the predicted image for the differential image with respect to the decoding target area, by using the decoded differential image stored in the storage memory.

14. The video decoding apparatus in accordance with claim 13, wherein:
the decoded differential image generation and storage device performs clipping so that each pixel of the decoded differential image has a pixel value within a predetermined effective range.

15. The video decoding apparatus in accordance with claim 9, further comprising:
an original image prediction device that generates a predicted image for the decoding target image, by using any one of an already-decoded image of the decoding target image and an already-decoded image which was obtained at the same viewpoint as that used for obtaining the decoding target image and at a time different from the time of the decoding target image,
wherein for the decoding target area, the image decoding device selectively performs one of decoding of the decoding target image by adding the predicted differential image generated by the differential image prediction device, the prediction residual decoded by the prediction residual decoding device, and the synthetic image, and decoding of the decoding target image by adding the predicted image generated by the original image prediction device to the prediction residual decoded by the prediction residual decoding device.

16. A video encoding method used in encoding of a multi-viewpoint image obtained by cameras having different viewpoints, wherein the method generates a synthetic image for a camera used for obtaining an encoding target image, by using at least one already-encoded reference camera image having a viewpoint different from the viewpoint of the camera used for obtaining the encoding target image, and disparity information between the reference camera image and the encoding target image, encodes the encoding target image by using the synthetic image, and comprises:
a differential image prediction step that generates a predicted image for a differential image between an input image of an encoding target area to be encoded and the synthetic image generated therefor;
a predicted image generation step that generates a predicted image for the encoding target area, where the predicted image is represented by the sum of the predicted differential image generated by the differential image prediction step and the synthetic image for the encoding target area; and
a prediction residual encoding step that encodes a prediction residual represented by a difference between the predicted image for the encoding target area generated by the predicted image generation step and the encoding target image of the encoding target area.

17. The video encoding method in accordance with claim 16, wherein:
the differential image prediction step generates the predicted image for the differential image with respect to the encoding target area, by using a differential image at a time which is the same as the time when the encoding target image was obtained, where the used differential image is represented by a difference between a decoded image of an already-encoded area in the encoding target image and the synthetic image for the already-encoded area.

18. The video encoding method in accordance with claim 16, wherein:
the differential image prediction step generates the predicted image for the differential image with respect to the encoding target area, by using a differential image at a time different from the time when the encoding target image was obtained, where the used differential image is represented by a difference between a decoded image of an already-encoded image which was obtained at the viewpoint used for obtaining the encoding target image and the synthetic image at the same time as the time of the decoded image.

19. The video encoding method in accordance with claim 16, further comprising:
- a prediction residual decoding step that decodes the prediction residual encoded by the prediction residual encoding step; and
- a decoded differential image generation and storage step that generates a decoded differential image represented by the sum of the decoded prediction residual generated by the prediction residual decoding step and the predicted differential image, and stores the generated decoded differential image into a storage memory,
- wherein the differential image prediction step generates the predicted image for the differential image with respect to the encoding target area, by using the decoded differential image stored in the storage memory.

20. The video encoding method in accordance with claim 16, further comprising:
- an original image prediction step that generates a predicted image for the encoding target image, by using any one of a decoded image of an already-encoded area in the encoding target image and a decoded image of an already-encoded image which was obtained at the same viewpoint as that used for obtaining the encoding target image and at a time different from the time of the encoding target image,
- wherein the predicted image generation step selectively performs one of generation of the predicted image for the encoding target image based on the predicted differential image and the synthetic image and generation of the predicted image for the encoding target image by directly using the predicted image generated by the original image prediction step.

21. A video decoding method used in decoding of encoded data of a multi-viewpoint image obtained by cameras having different viewpoints, wherein the method generates a synthetic image for a camera used for obtaining a decoding target image, by using at least one already-decoded reference camera image having a viewpoint different from the viewpoint of the camera used for obtaining a decoding target image, and disparity information between the reference camera image and the decoding target image, decodes encoded data of the decoding target image by using the synthetic image, and comprises: a prediction residual decoding step that decodes a prediction residual of the decoding target image, where the prediction residual is included in the encoded data; a differential image prediction step that generates a predicted image for a differential image between a decoding target image of a decoding target area to be decoded and the synthetic image generated therefor; and an image decoding step that decodes the decoding target image by adding the predicted differential image generated by the differential image prediction step, the prediction residual decoded by the prediction residual decoding step, and the synthetic image.

22. The video decoding method in accordance with claim 21, wherein:
- the differential image prediction step generates the predicted image for the differential image with respect to the decoding target area, by using a differential image at a time which is the same as the time when the decoding target image was obtained, where the used differential image is represented by a difference between a decoded image of an already-decoded area in the decoding target image and the synthetic image for the already-decoded area.

23. The video decoding method in accordance with claim 21, wherein:
- the differential image prediction step generates the predicted image for the differential image with respect to the decoding target area, by using a differential image at a time different from the time when the decoding target image was obtained, where the used differential image is represented by a difference between an already-decoded reference image which was obtained at the viewpoint used for obtaining the decoding target image and the synthetic image at the same time as the time of the reference image.

24. The video decoding method in accordance with claim 21, further comprising:
- a decoded differential image generation and storage step that generates a decoded differential image represented by the sum of the decoded prediction residual generated by the prediction residual decoding step and the predicted differential image, and stores the generated decoded differential image into a storage memory,
- wherein the differential image prediction step generates the predicted image for the differential image with respect to the decoding target area, by using the decoded differential image stored in the storage memory.

25. The video decoding method in accordance with claim 24, wherein:
- the decoded differential image generation and storage step performs clipping so that each pixel of the decoded differential image has a pixel value within a predetermined effective range.

26. The video decoding method in accordance with claim 21, further comprising:
- an original image prediction step that generates a predicted image for the decoding target image, by using any one of an already-decoded image of the decoding target image and an already-decoded image which was obtained at the same viewpoint as that used for obtaining the decoding target image and at a time different from the time of the decoding target image,
- wherein for the decoding target area, the image decoding step selectively performs one of decoding of the decoding target image by adding the predicted differential image generated by the differential image prediction step, the prediction residual decoded by the prediction residual decoding step, and the synthetic image, and decoding of the decoding target image by adding the predicted image generated by the original image prediction step to the prediction residual decoded by the prediction residual decoding step.

27. A non-transitory computer-readable storage medium which stores a video encoding program by which a computer executes a process for implementing the video encoding apparatus in accordance with claim 1.

28. A non-transitory computer-readable storage medium which stores a video decoding program by which a computer executes a process for implementing the video decoding apparatus in accordance with claim 9.

* * * * *